US009599511B2

(12) United States Patent
Ando et al.

(10) Patent No.: US 9,599,511 B2
(45) Date of Patent: Mar. 21, 2017

(54) IMAGING APPARATUS COMPRISING CODING ELEMENT AND SPECTROSCOPIC SYSTEM COMPRISING THE IMAGING APPARATUS

(71) Applicant: Panasonic Intellectual Property Management Co., Ltd., Osaka (JP)

(72) Inventors: Takamasa Ando, Osaka (JP); Tsuguhiro Korenaga, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 14/927,393

(22) Filed: Oct. 29, 2015

(65) Prior Publication Data
US 2016/0138975 A1 May 19, 2016

(30) Foreign Application Priority Data

Nov. 19, 2014 (JP) .................................. 2014-234184
Feb. 20, 2015 (JP) .................................. 2015-032075

(51) Int. Cl.
*G01N 21/25* (2006.01)
*G01J 3/28* (2006.01)
*G01J 3/02* (2006.01)

(52) U.S. Cl.
CPC ........... *G01J 3/2823* (2013.01); *G01J 3/0229* (2013.01); *G01J 3/28* (2013.01)

(58) Field of Classification Search
CPC ........ G01J 3/26; G01J 3/02; G01J 3/51; G01J 9/00; G01N 21/255
See application file for complete search history.

(56) References Cited

U.S. PATENT DOCUMENTS 6,791,933 B1 * 9/2004 Yoo ..................... G02B 27/0944
  369/112.01
7,227,704 B2 * 6/2007 Koike ..................... G02B 5/188
  359/719
(Continued)

FOREIGN PATENT DOCUMENTS

JP       8-046748      2/1996
JP    2007-108124      4/2007
(Continued)

*Primary Examiner* — Tarifur Chowdhury
*Assistant Examiner* — MD M Rahman
(74) *Attorney, Agent, or Firm* — McDermott Will & Emery LLP

(57) ABSTRACT

An imaging apparatus according to an aspect of the present disclosure includes a first coding element that includes regions arrayed two-dimensionally in an optical path of light incident from an object, and an image sensor. Each of the regions includes first and second regions. A wavelength distribution of an optical transmittance of the first region has a maximum in each of first and second wavelength bands, and a wavelength distribution of an optical transmittance of the second region has a maximum in each of third and fourth wavelength bands. At least one selected from the group of the first and second wavelength bands differs from the third and fourth wavelength bands. The image sensor acquires an image in which components of the first, second, third and fourth wavelength bands of the light that has passed through the first coding element are superimposed on one another.

20 Claims, 23 Drawing Sheets

(56) References Cited

U.S. PATENT DOCUMENTS

| | | | |
|---|---|---|---|
| 2006/0038705 A1 | 2/2006 | Brady et al. | |
| 2006/0146422 A1* | 7/2006 | Koike | G02B 5/188 |
| | | | 359/742 |
| 2006/0289958 A1* | 12/2006 | Sasaki | G02B 5/201 |
| | | | 257/440 |
| 2008/0019232 A1* | 1/2008 | Yoo | G11B 7/1275 |
| | | | 369/44.23 |
| 2008/0074292 A1 | 3/2008 | Brady et al. | |
| 2009/0016198 A1* | 1/2009 | Katayama | G11B 7/127 |
| | | | 369/112.23 |
| 2009/0027518 A1 | 1/2009 | Kita | |
| 2009/0244355 A1 | 10/2009 | Horie | |
| 2011/0124966 A1* | 5/2011 | Uzawa | A61B 1/00096 |
| | | | 600/178 |
| 2013/0341493 A1* | 12/2013 | Ando | G01C 3/32 |
| | | | 250/208.1 |
| 2014/0163391 A1 | 6/2014 | Koizumi et al. | |
| 2014/0240514 A1 | 8/2014 | Love et al. | |

FOREIGN PATENT DOCUMENTS

| | | |
|---|---|---|
| JP | 2011-089895 | 5/2011 |
| JP | 2013-104789 | 5/2013 |
| JP | 2013-113900 | 6/2013 |
| WO | 2007/046280 | 4/2007 |
| WO | 2013/002350 | 1/2013 |

\* cited by examiner

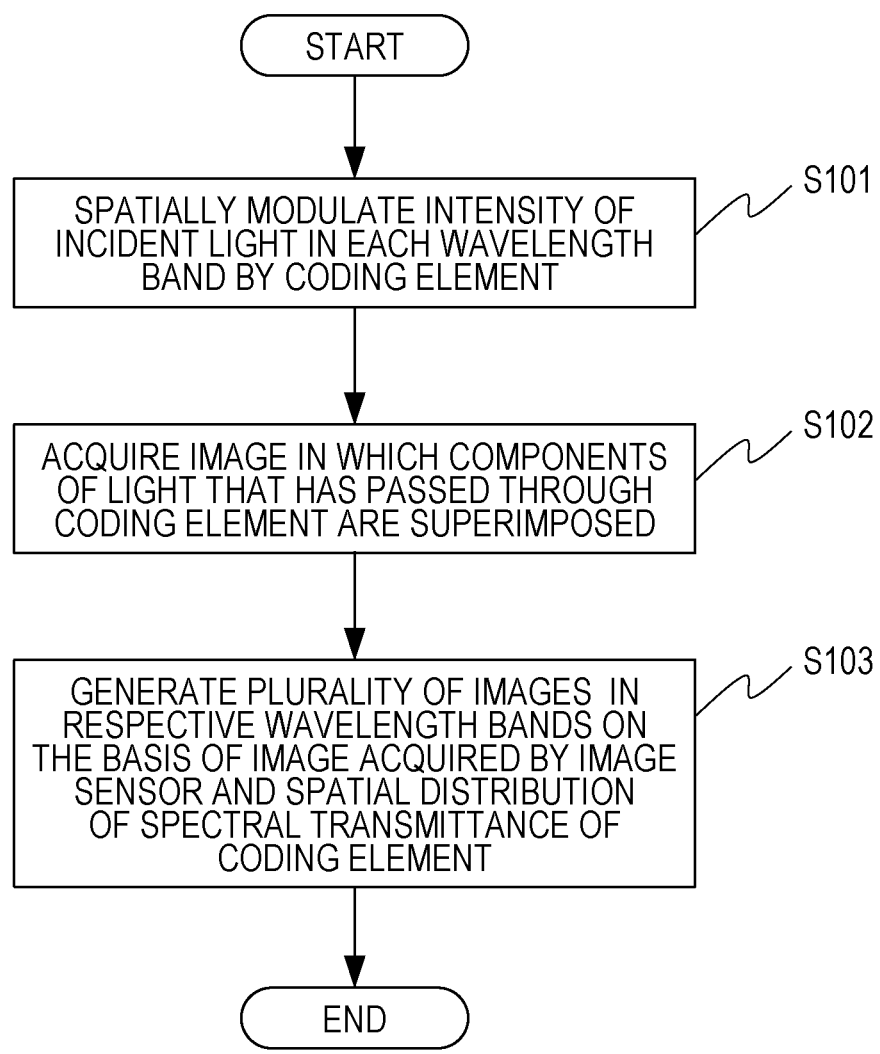

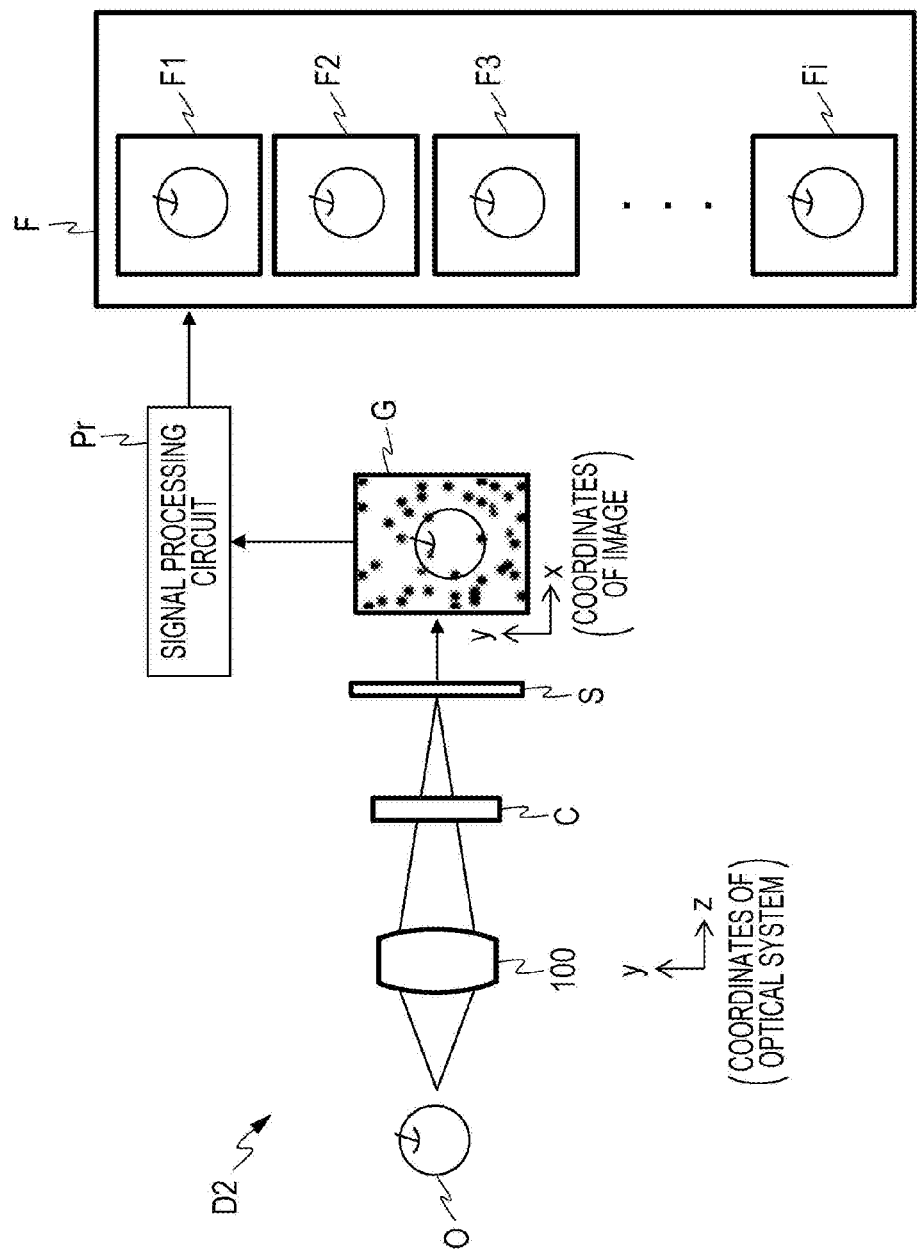

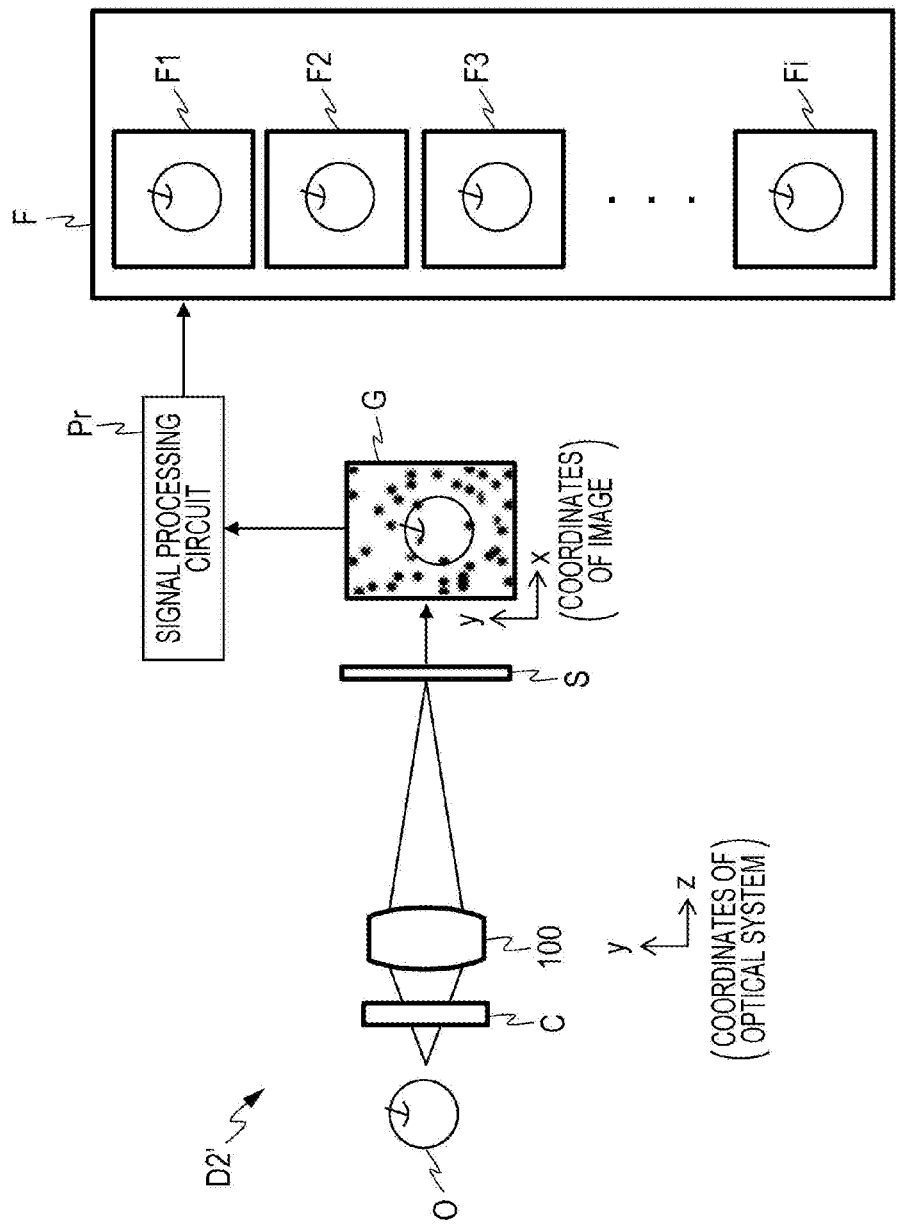

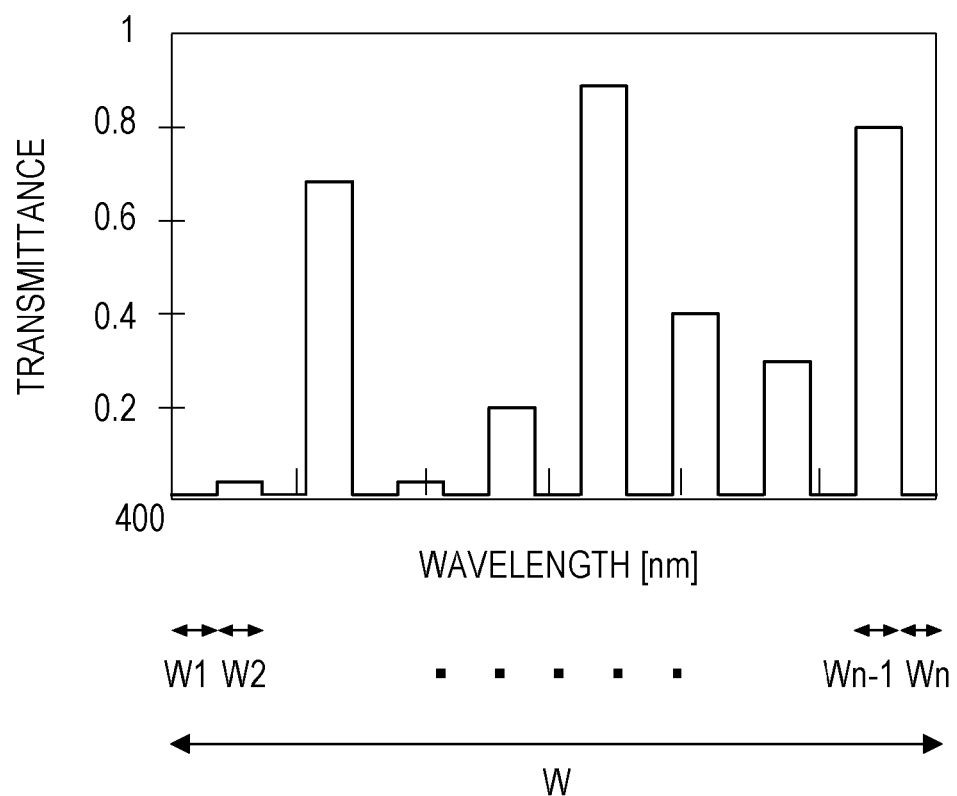

FIG. 21A
FIG. 21B
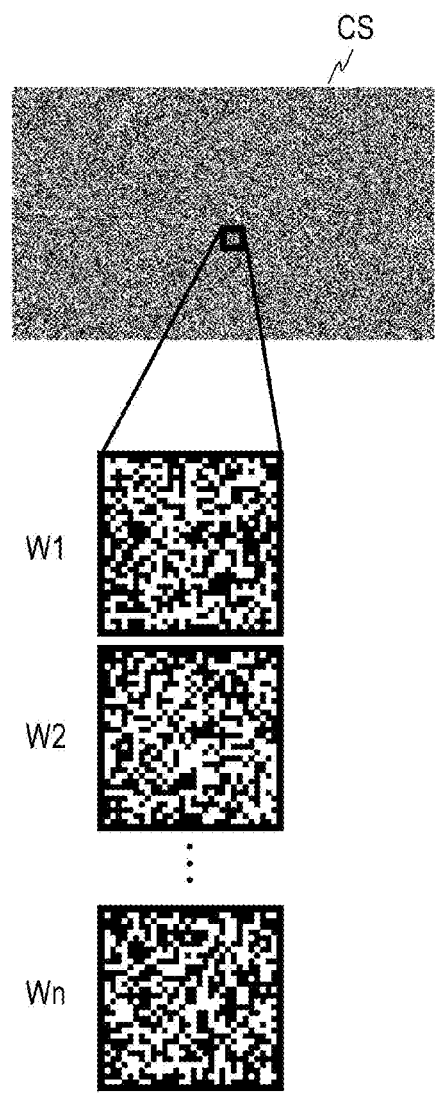
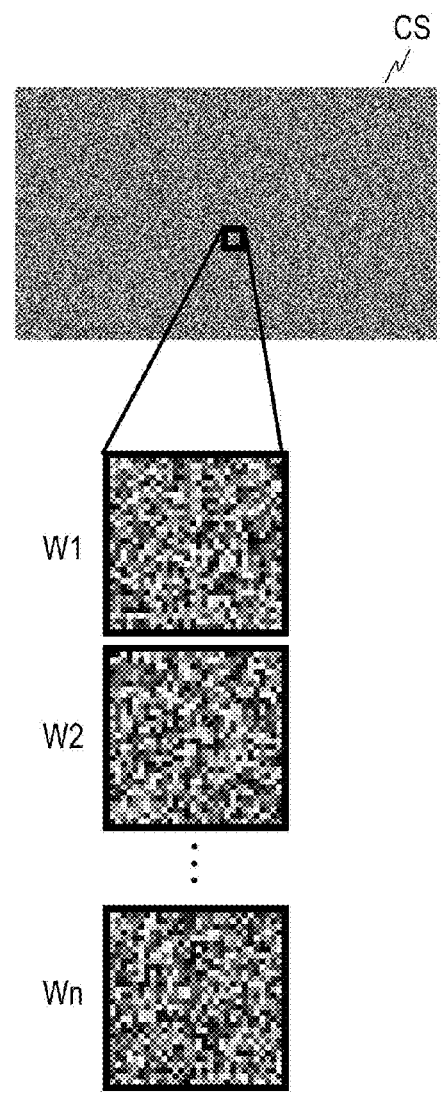

IMAGING APPARATUS COMPRISING CODING ELEMENT AND SPECTROSCOPIC SYSTEM COMPRISING THE IMAGING APPARATUS

BACKGROUND

1. Technical Field

The present disclosure relates to coding elements, imaging apparatuses, and spectroscopic systems for acquiring spectral images and to spectroscopic methods in which such coding elements, imaging apparatuses, and spectroscopic systems are used.

2. Description of the Related Art

The use of spectral information of a number of narrow bands (e.g., several tens of bands or more) makes it possible to grasp detailed physical properties of an observation object, which has been impossible with conventional RGB images. Cameras for acquiring such multi-wavelength information are called hyperspectral cameras. Hyperspectral cameras are used in a variety of fields, including food inspection, biopsy, drug development, and mineral component analyses.

As an exemplary use of images acquired with wavelengths to be observed being limited to narrow bands, International Publication No. WO 2013/1002350 discloses an apparatus for distinguishing between a tumor site and a non-tumor site of a subject. This apparatus detects fluorescence at 635 nm from protoporphyrin IX accumulated in cancer cells and fluorescence at 675 nm from photo-protoporphyrin that are emitted in response to irradiation of pumping light. Thus, a tumor site and a non-tumor site are identified.

Japanese Unexamined Patent Application Publication No. 2007-108124 discloses a method for determining the freshness of perishables that decreases with time by acquiring information on the reflectance characteristics of continuous multi-wavelength light.

Hyperspectral cameras that can obtain multi-wavelength images or measure multi-wavelength reflectance can roughly be divided into the following four types:

(a) line-sensor-based hyperspectral cameras
(b) electrofilter-based hyperspectral cameras
(c) Fourier-transform-based hyperspectral cameras
(d) interference-filter-based hyperspectral cameras (a) With a line-sensor-based hyperspectral camera, one-dimensional information of an object is acquired by using a member having a linear slit. Light that has passed through the slit is spot in accordance with the wavelengths by a dispersive element, such as a diffraction grating and a prism. The split light rays of the respective wavelengths are detected by an image sensor having a plurality of pixels arrayed two-dimensionally. This method allows only one-dimensional information of the object to be obtained at once. Thus, two-dimensional spectral information is obtained by scanning the entire camera or the entire measurement object in a direction perpendicular to the direction in which the slit extends. Line-sensor-based hyperspectral cameras have an advantage that high-resolution multi-wavelength images can be obtained. Japanese Unexamined Patent Application Publication No. 2011-89895 discloses an example of line-sensor-based hyperspectral cameras.

(b) An electrofilter-based hyperspectral camera that includes a liquid-crystal tunable filter (LCTF) and an electrofilter-based hyperspectral camera that includes an acousto-optic tunable filter (AOTF) are available. A liquid-crystal tunable filter is an element in which a linear polarizer, a birefringent filter, and a liquid-crystal cell are arranged in multiple stages. Light at unwanted wavelengths can be removed only by controlling the voltage, and light only at a specific desired wavelength can be extracted. An acousto-optic tunable filter is constituted by an acousto-optic crystal to which a piezoelectric element is bonded. Upon an electric signal being applied to the acousto-optic crystal, ultrasonic waves are generated, and compressional standing waves are produced inside the crystal. Through the diffraction effect of the standing waves, light only at a specific desired wavelength can be extracted. This method has an advantage that high-resolution moving image data can be obtained, although the wavelengths are limited.

(c) A Fourier-transform-based hyperspectral camera utilizes the principle of a two-beam interferometer. A light beam from an object to be measured is split by a beam splitter. The respective split light beams are then reflected by a stationary mirror and a movable mirror, recombined together, and detected by a detector. By temporally varying the position of the movable mirror, data indicating a change in the interference intensity that is dependent on the wavelength of light can be acquired. The obtained data is subjected to the Fourier transform, and the spectral information is thus obtained. The advantage of the Fourier-transform-based hyperspectral camera is that information on multiple wavelengths can be obtained simultaneously.

(d) An interference-filter-based hyperspectral camera utilizes the principle of a Fabry-Perot interferometer. A configuration in which an optical element having two surfaces with high reflectance that are spaced apart by a predetermined distance is disposed on a sensor is employed. The distance between the two surfaces of the optical element differs in different regions and is determined so as to match an interference condition of light at a desired wavelength. An interference-filter-based hyperspectral camera has an advantage that information on multiple wavelength can be acquired simultaneously in the form of a moving image.

Aside from the above-described methods, there is a method in which compressed sensing is used, as disclosed, for example, in U.S. Pat. No. 7,283,231. The apparatus disclosed in U.S. Pat. No. 7,283,231 splits light from an object to be measured by a first dispersive element, such as a prism, marks with a coding mask, and returns the path of the light ray by a second dispersive element. Thus, an image that has been coded and multiplexed with respect to the wavelength axis is acquired by a sensor. By applying the compressed sensing, a plurality of images of multiple wavelengths can be reconstructed from the multiplexed image.

The compressed sensing is a technique for reconstructing, from a small number of samples of acquired data, a greater number of pieces of data. When the two-dimensional coordinates of an object to be measured are (x,y) and the wavelength is $\lambda$, data f to be obtained is three-dimensional data of x, y, and $\lambda$. In the meantime, image data g obtained by the sensor is two-dimensional data that has been compressed and multiplexed in the $\lambda$-axis direction. The problem of obtaining the data f, which has a larger amount of data, from the obtained image g, which has a smaller amount of data, is a so-called ill-posed problem and cannot be solved as-is. However, typically, data of a natural image has redundancy, and by using the redundancy efficiently, this ill-posed problem can be transformed to a well-posed problem. JPEG compression is an example of techniques for reducing the amount of data by utilizing the redundancy of an image. JPEG compression employs a method in which image information is converted to frequency components and a nonessential portion of the data, such as a component with low visual recognizability, is removed. In the compressed sensing, such a technique is incorporated into an operation process, and the data space to be obtained is transformed into a space expressed by the redundancy. Thus, the unknowns are reduced, and the solution is obtained. In this transformation, for example, the discrete cosine transform (DCT), the wavelet transform, the Fourier transform, the total variation (TV), or the like is used.

SUMMARY

In one general aspect, the techniques disclosed here feature an imaging apparatus that includes a first coding element that includes regions arrayed two-dimensionally in an optical path of light incident from an object and an image sensor disposed in an optical path of light that has passed through the first coding element. The regions include a first region and a second region. A wavelength distribution of an optical transmittance of the first region has a local maximum in each of a first wavelength band and a second wavelength band that differ from each other, and a wavelength distribution of an optical transmittance of the second region has a local maximum in each of a third wavelength band and a fourth wavelength band that differ from each other. When the wavelength distribution of the optical transmittance of the first region is normalized such that the optical transmittance of the first region has a maximum value of 1 and a minimum value of 0, the local maxima in the first wavelength band and the second wavelength band are both no less than 0.5, and when the wavelength distribution of the optical transmittance of the second region is normalized such that the optical transmittance of the second region has a maximum value of 1 and a minimum value of 0, the local maxima in the third wavelength band and the fourth wavelength band are both no less than 0.5. At least one selected from the group of the first wavelength band and the second wavelength band differs from the third wavelength band and the fourth wavelength band. The image sensor acquires an Image in which components of the first wavelength band, the second wavelength band, the third wavelength band, and the fourth wavelength band of the light that has passed through the first coding element are superimposed on one another.

According to the present disclosure, an occurrence of coma aberration and a decrease in the resolution associated with the occurrence of coma aberration can be suppressed.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 7 is a flowchart illustrating an overview of a spectroscopic method according to the second embodiment;

FIG. 8A is a schematic diagram illustrating an imaging apparatus D2 according to a third embodiment of the present disclosure;

FIG. 8B is a schematic diagram illustrating an imaging apparatus D2' according to a modification of the third embodiment of the present disclosure;

FIG. 19 illustrates an example of the wavelength and the intensity of light obtained when the light has passed through both the narrow-band coding element C1 and the spatially modulating coding element CS;

FIG. 21A illustrates an example of the transmittance distribution of the spatially modulating coding element CS according to the fourth embodiment;

FIG. 21B illustrates another example of the transmittance distribution of the spatially modulating coding element CS according to the fourth embodiment.

DETAILED DESCRIPTION

Figure 1A:
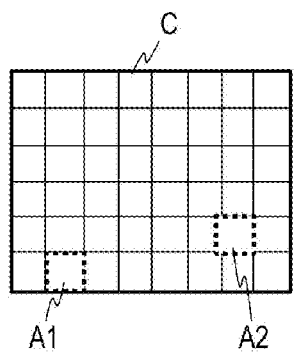
FIG. 1A schematically illustrates a configuration of a coding element C according to a first embodiment.

Prior to describing embodiments of the present disclosure, underlying knowledge found by the present inventor will be described.

According to the study by the present inventor, the conventional hyperspectral cameras described above have the following issues. (a) The line-sensor-based hyperspectral camera needs to be scanned in order to obtain a two-dimensional image and is thus not suitable for capturing a moving image of an object to be measured. (c) With the Fourier-transform-based hyperspectral camera as well, the reflective mirror needs to be moved, and the Fourier-transform-based hyperspectral camera is thus not suitable for capturing a moving image. (b) With the electrofilter-based hyperspectral camera, an image is acquired at each wavelength, and a multi-wavelength image cannot be obtained at once. (d) With the interference-filter-based hyperspectral camera, there is a trade-off between the number of wavelength bands in which images can be acquired and the spatial resolving power, and thus the spatial resolving power is compromised when a multi-wavelength image is acquired. In this manner, none of the existing hyperspectral cameras simultaneously satisfy the three conditions: a high resolution, multiple wavelengths, and moving image capturing (one-shot shooting).

The configuration that uses the compressed sensing appears to simultaneously satisfy the three conditions: a high-resolution, multiple wavelengths, and moving image capturing. However, an image is reconstructed on the basis of estimation from a small amount of data, and thus the spatial resolution of the acquired image is likely to be lower than that of the original image. In particular, as the compression rate of the acquired data is higher, effect thereof appears more prominently. Furthermore, since a dispersive element, such as a prism, is disposed in an optical path, coma aberration occurs, which leads to a problem in that the resolution decreases.

The present inventor has found the above-described problems and examined configurations for solving these problems. The present inventor has found that an occurrence of coma aberration can be suppressed and the resolution can be increased by appropriately designing the spectral transmittance in each region of a coding element. According to an embodiment of the present disclosure, the three demands, namely, a high resolution, multiple wavelengths, and moving image capturing (one-shot shooting) can be fulfilled simultaneously. In addition, in an embodiment of the present disclosure, of the three-dimensional information of the x-direction, the y-direction, and the wavelength direction, the information in the wavelength direction is compressed. Therefore, only the two-dimensional data needs to be retained, and the amount of data can be reduced. Thus, an embodiment of the present disclosure is effective when data of an extended period of time is to be acquired.

The present disclosure includes an imaging apparatus, a system, and a method according to the following items.

[Item 1]

An imaging apparatus, comprising a first coding element that includes regions arrayed two-dimensionally in an optical path of light incident from an object; and an image sensor disposed in an optical path of light that has passed through the first coding element, wherein the regions include a first region and a second region, wherein a wavelength distribution of an optical transmittance of the first region has a local maximum in each of a first wavelength band and a second wavelength band that differ from each other, wherein a wavelength distribution of an optical transmittance of the second region has a local maximum in each of a third wavelength band and a fourth wavelength band that differ from each other, wherein, when the wavelength distribution of the optical transmittance of the first region is normalized such that the optical transmittance of the first region has a maximum value of 1 and a minimum value of 0, the local maxima in the first wavelength band and the second wavelength band are both no less than 0.5, wherein, when the wavelength distribution of the optical transmittance of the second region is normalized such that the optical transmittance of the second region has a maximum value of 1 and a minimum value of 0, the local maxima in the third wavelength band and the fourth wavelength band are both no less than 0.5, wherein, at least one selected from the group of the first wavelength band and the second wavelength band differs from the third wavelength band and the fourth wavelength band, and wherein, in operation, the image sensor acquires an image in which components of the first wavelength band, the second wavelength band, the third wavelength band, and the fourth wavelength band of the light that has passed through the first coding element are superimposed on one another.

[Item 2]

The imaging apparatus according to Item 1, wherein the regions include at least one transparent region.

[Item 3]

The imaging apparatus according to Item 2, wherein the at least one transparent region comprises a plurality of transparent regions, wherein the regions include regions whose optical transmittance differs at different wavelengths and the plurality of transparent regions, the two regions are arrayed in an alternating manner in one array direction of the regions and another array direction that is perpendicular to the one array direction.

[Item 4]

The imaging apparatus according to any one of Items 1 to 3, wherein the regions are arrayed two-dimensionally in a matrix, wherein a vector having, as its elements, values of transmittance of light in a fifth wavelength band in respective regions belonging to a set of regions arrayed in a single row or column included in the regions and a vector having, as its elements, values of transmittance of light in the fifth wavelength band in respective regions belonging to a set of regions arrayed in another row or column included in the regions are independent from each other, and wherein a vector having, as its elements, values of transmittance of light in a sixth wavelength band in respective regions belonging to a set of regions arrayed in a single row or column included in the regions and a vector having, as its elements, values of transmittance of light in the sixth wavelength band in respective regions belonging to a set of regions arrayed in another row or column included in the regions are independent from each other.

[Item 5]

The imaging apparatus according to any one of Items 1 to 4, further comprising an optical system that is disposed between the object and the first coding element and that converges the light from the object on a surface of the first coding element, wherein the first coding element is disposed on the image sensor.

[Item 6]

The imaging apparatus according to Item 5, wherein the image sensor includes pixels, and wherein the regions correspond to the respective pixels.

[Item 7]

The imaging apparatus according to any one of Items 1 to 4, further comprising an optical system that is disposed between the object and the first coding element and that converges the light from the object on a surface of the image sensor, wherein the first coding element and the image sensor are spaced apart from each other.

[Item 8]

The imaging apparatus according to any one of Items 1 to 4, further comprising an optical system that is disposed between the first coding element and the image sensor and that converges the light from the object that has passed through the first coding element on a surface of the image sensor.

[Item 9]

The imaging apparatus according to any one of Items 1 to 8, further comprising a signal processing circuit that, in operation, generates images in respective wavelength bands of the light that has passed through the first coding element on the basis of the image acquired by the image sensor and a spatial distribution and a wavelength distribution of an optical transmittance of the first coding element.

[Item 10]

The imaging apparatus according to Item 9, wherein, in operation, the signal processing circuit generates the images in the respective wavelength bands through a statistical method.

[Item 11]

The imaging apparatus according to Item 9 or 10, wherein the number of pieces of data in the images in the respective wavelength bands is greater than the number of pieces of data in the image acquired by the image sensor.

[Item 12]

The imaging apparatus according to any one of Items 9 to 11, wherein the image sensor includes pixels, and wherein, in operation, the signal processing circuit generates, as the images in the respective wavelength bands, a vector f' estimated on the basis of the expression $$f' = \operatorname*{argmin}_{f}\{\|g - Hf\|_{l_2} + \tau\Phi(f)\},$$

wherein $\phi(f)$ is a regularization term and $\tau$ is a weighting factor, by using a vector g having, as its elements, signal values of the pixels in the image acquired by the image sensor and a matrix H determined by the spatial distribution and the wavelength distribution of the optical transmittance of the first coding element.

[Item 13]

The imaging apparatus according to any one of Items 9 to 12, wherein, in operation, the signal processing circuit generates the images in the respective wavelength bands in the form of a moving image.

[Item 14]

The imaging apparatus according to any one of Items 1 to 13, further comprising at least one second coding element whose optical transmittance is uniform in a spatial direction and that includes light-transmitting regions and light-blocking regions arrayed in the wavelength direction, wherein the image sensor is disposed in an optical path of light that has passed through the first coding element and the at least one second coding element.

[Item 15]

The imaging apparatus according to Item 14, wherein, in the at least one second coding element, the light-transmitting regions have an equal wavelength band width and the light-blocking regions present between two closest light-transmitting regions in the light-transmitting regions have an equal wavelength band width.

[Item 16]

The imaging apparatus according to Item 14 or 15, wherein the at least one second coding element comprises a plurality of second coding elements, and wherein wavelength bands of the light-transmitting regions in one of the plurality of second coding elements are different from wavelength bands of the light-transmitting regions in another one of the plurality of second coding elements.

[Item 17]

The imaging apparatus according to any one of Items 14 to 16, further comprising a signal processing circuit that, in operation, generates images in respective wavelength bands of the light that has passed through the first coding element and the at least one second coding element on the basis of the image output by the image sensor, a spatial distribution and a wavelength distribution of an optical transmittance of the first coding element, and a wavelength distribution of an optical transmittance of the at least one second coding element.

[Item 18]

The imaging apparatus according to any one of Items 1 to 17, wherein the wavelength distribution of the optical transmittance in each of the regions is a random distribution.

[Item 19]

The imaging apparatus according to any one of Items 1 to 18, wherein a spatial distribution of the optical transmittance of the first coding element in each of the first wavelength band, the second wavelength band, the third wavelength band, and the fourth wavelength band is a random distribution.

[Item 20]

A spectroscopic system comprising:

an imaging apparatus that includes a first coding element that includes regions arrayed two-dimensionally in an optical path of light incident from an object; and an image sensor disposed in an optical path of light that has passed through the first coding element, wherein the regions include a first region and a second region, wherein a wavelength distribution of an optical transmittance of the first region has a local maximum in each of a first wavelength band and a second wavelength band that differ from each other, wherein a wavelength distribution of an optical transmittance of the second region has a local maximum in each of a third wavelength band and a fourth wavelength band that differ from each other, wherein, when the wavelength distribution of the optical transmittance of the first region is normalized such that the optical transmittance of the first region has a maximum value of 1 and a minimum value of 0, the local maxima in the first wavelength band and the second wavelength band are both no less than 0.5, wherein, when the wavelength distribution of the optical transmittance of the second region is normalized such that the optical transmittance of the second region has a maximum value of 1 and a minimum value of 0, the local maxima in the third wavelength band and the fourth wavelength band are both no less than 0.5, wherein, at least one selected from the group of the first wavelength band and the second wavelength band differs from the third wavelength band and the fourth wavelength band, and wherein, in operation, the image sensor acquires an image in which components of the first wavelength band, the second wavelength band, the third wavelength band, and the fourth wavelength band of light that has passed through the first coding element are superimposed on one another; and a signal processing device that, in operation, generates images in respective wavelength bands of the light that has passed through the first coding element on the basis of the image acquired by the image sensor and a spatial distribution and a wavelength distribution of an optical transmittance of the first coding element.

[Item 21]

A coding element to be used in a spectroscopic system that generates an image in each of mutually different wavelength bands, the coding element comprising:

regions arrayed two-dimensionally, wherein the regions include two or more regions having mutually different spectral transmittances, and the spectral transmittance in each of the two or more regions has local maxima in at least two of the wavelength bands.

[Item 22]

The coding element according to Item 21, wherein the optical transmittance at the local maxima is no less than 0.8.

[Item 23]

The coding element according to Item 21 or 22, wherein combinations of the at least two wavelength bands in the two or more regions differ from each other.

[Item 24]

The coding element according to any one of Items 21 to 23, wherein the regions include at least one transparent region,

[Item 25]

The coding element according to Item 24, wherein the at least one transparent region comprises a plurality of transparent regions, wherein the regions include regions whose optical transmittance differs in difference wavelengths and the plurality of transparent regions, the two regions are arrayed in an alternating manner in two array directions of the regions,

[Item 26]

A coding element to be used in a spectroscopic system that generates an image in each of wavelength bands including an image in a first wavelength band and an image in a second wavelength band, the coding element comprising:

regions that are arrayed two-dimensionally in a matrix, wherein a vector having, as its elements, values of transmittance of light in the first wavelength band in respective regions belonging to a set of regions arrayed in a single row or column included in the regions and a vector having, as its elements, values of transmittance of light in the first wavelength band in respective regions belonging to a set of regions arrayed in another row or column included in the regions are independent from each other, wherein a vector having, as its elements, values of transmittance of light in the second wavelength band in respective regions belonging to a set of regions arrayed in a single row or column included in the regions and a vector having, as its elements, values of transmittance of light in the second wavelength band in respective regions belonging to a set of regions arrayed in another row or column included in the regions are independent from each other, and wherein a spectral transmittance in each of two or more regions included in the regions has local maxima in the first and second wavelength bands.

[Item 27]

An imaging apparatus, comprising:

the coding element according to any one of Items 21 to 26 that is disposed in an optical path of light incident from an object; and an image sensor that is disposed in an optical path of light that has passed through the coding element and that acquires an image in which components of the wavelength bands that have passed through the coding element are superimposed on one another.

[Item 28]

The imaging apparatus according to Item 27, further comprising an optical system that is disposed between the object and the coding element and that converges the light from the object on a surface of the coding element, wherein the coding element is disposed on the image sensor.

[Item 29]

The imaging apparatus according to Item 28, wherein the regions in the coding element correspond to respective pixels in the image sensor.

[Item 30]

The imaging apparatus according to Item 27, further comprising an optical system that is disposed between the object and the coding element and that converges the light from the object on a surface of the image sensor, wherein the coding element and the image sensor are spaced apart from each other.

[Item 31]

The imaging apparatus according to Item 27, further comprising an optical system that is disposed between the coding element and the image sensor and that converges the light from the object that has passed through the coding element on a surface of the image sensor.

[Item 32]

The imaging apparatus according to any one of Items 27 to 31, further comprising a signal processing circuit that, in operation, generates images in respective wavelength bands of the light that has passed through the coding element on the basis of the image acquired by the image sensor and a spatial distribution of a spectral transmittance of the coding element.

[Item 33]

The imaging apparatus according to Item 32, wherein the signal processing circuit generates the images in the respective wavelength bands through a statistical method.

[Item 34]

The imaging apparatus according to Item 32 or 33, wherein the number of pieces of data of the images in the respective wavelength bands of the light is greater than the number of pieces of data of the image acquired by the image sensor.

[Item 35]

The imaging apparatus according to any one of Items 32 to 34, wherein, in operation, the signal processing circuit generates, as the images in the respective wavelength bands, a vector f' estimated on the basis of the expression $$f' = \mathrm{argmin}_{f}\{\|g - Hf\|_{l_2} + \tau\Phi(f)\},$$

wherein $\phi(f)$ is a regularization term and $\tau$ is a weighting factor, by using a vector g having, as its elements, signal values of the pixels in the image acquired by the image sensor and a matrix H determined by the spatial distribution of the spectral transmittance of the coding element.

[Item 36]

The imaging apparatus according to any one of Items 32 to 35, wherein the signal processing circuit generates the images in the respective wavelength bands in the form of a moving image.

[Item 37]

A spectroscopic system, comprising:

the imaging apparatus according to any one of Items 27 to 31; and a signal processing device that, in operation, generates images in respective wavelength bands of the light that has passed through the coding element on the basis of an image acquired by the image sensor and a spatial distribution of a spectral transmittance of the coding element.

[Item 38]

A spectroscopic method, comprising:

modulating an intensity of incident light by using the coding element according to any one of Items 21 to 26 that is disposed in an optical path of light incident from an object;

acquiring an image in which components of wavelength bands of light that has passed through the coding element are superimposed on one another; and generating images in respective wavelength bands of the light that has passed through the coding element on the basis of the image and a spatial distribution of a spectral transmittance of the coding element.

[Item 41]

An imaging apparatus to be used in a spectroscopic system that generates images in respectively different wavelength bands, the imaging apparatus comprising:

at least one narrow-band coding element whose optical transmittance is uniform in a spatial direction and that includes light-transmitting regions and light-blocking regions arrayed in a wavelength direction;

a spatially modulating coding element that is disposed in a path of light that passes through the at least one narrow-band coding element and that includes light-transmitting regions and light-blocking regions arrayed in the spatial direction; and an image sensor that, in operation, acquires light coded by the at least one narrow-band coding element and the spatially modulating coding element.

[Item 42]

The imaging apparatus according to Item 41, wherein, in the at least one narrow-band coding element, the light-transmitting regions have an equal wavelength band width and the light-blocking regions between two closest light-transmitting regions have an equal wavelength band width.

[Item 43]

The imaging apparatus according to Item 41 or 42, wherein the at least one narrow-band coding element comprises a plurality of narrow-band coding elements, and the light-transmitting regions in the plurality of narrow-band coding elements are mutually different wavelength ranges.

[Item 44]

The imaging apparatus according to Item 43, wherein the light-transmitting regions in the plurality of narrow-band coding elements include all of the different wavelength bands.

[Item 45]

The imaging apparatus according to any one of Items 41 to 44, wherein, in the spatially modulating coding element, the spatial distribution of the light-transmitting regions and the light-blocking regions differs in the different wavelength bands.

[Item 46]

The imaging apparatus according to any one of Items 41 to 44, further comprising a dispersive element that is disposed in the path of the light that passes through the at least one narrow-band coding element and that disperses light in the spatial direction in accordance with the wavelength, wherein the optical transmittance of the spatially modulating coding element is uniform in the wavelength direction.

[Item 47]

A spectroscopic system, comprising:

the imaging apparatus according to Item 45; and a signal processing circuit that, in operation, generates images in respectively different wavelength bands on the basis of a captured image output from the image sensor in the imaging apparatus, wavelength distribution information of the optical transmittance of the at least one narrow-band coding element, and spatial distribution information and wavelength distribution information of the optical transmittance of the spatially modulating coding element.

[Item 48]

A spectroscopic system, comprising:

the imaging apparatus according to Item 46; and a signal processing circuit that, in operation, generates images in respectively different wavelength bands on the basis of a captured image output from the image sensor in the imaging apparatus, wavelength distribution information of the optical transmittance of the at least one narrow-band coding element, spatial distribution information of the optical transmittance of the spatially modulating coding element, and dispersion characteristics of the dispersive element.

[Item 49]

A spectral filter to be used in a spectroscopic system that, in operation, generates images in respectively different wavelength bands, the spectral filter comprising:

light-transmitting regions and light-blocking regions arrayed in a spatial direction, wherein the light-transmitting regions have an equal wavelength band width and the light-blocking regions present between two closest light-transmitting regions have an equal wavelength band width.

[Item 50]

A spectroscopic method in which used is an imaging apparatus that includes a first narrow-band coding element and a second narrow-band coding element each having an optical transmittance that is uniform in a spatial direction and each including light-transmitting regions and light-blocking regions arrayed in a wavelength direction, a spatially modulating coding element that is disposed in a path of light that passes through one of the first narrow-band coding element and the second narrow-band coding element and that includes light-transmitting regions and light-blocking regions arrayed in the spatial direction, and an image sensor that, in operation, acquires light coded by the first narrow-band coding element, the second narrow-band coding element, and the spatially modulating coding element, wherein, in operation, the first narrow-band coding element and the spatially modulating coding element code light from an object, the image sensor acquires light coded by the first narrow-band coding element and the spatially modulating coding element to generate a first pixel signal, the first narrow-band coding element is replaced with the second narrow-band coding element, the second narrow-band coding element and the spatially modulating coding element code the light from the object, and the image sensor acquires light coded by the second narrow-band coding element and the spatially modulating coding element to generate a second pixel signal.

Hereinafter, more specific embodiments of the present disclosure will be described with reference to the drawings. In the following description, a signal indicating an image (a set of signals representing the pixel values of respective pixels) may simply be referred to as an image. In the following description, the xyz-coordinates indicated in the drawings will be used.

First Embodiment

FIGS. 1A to 1D are illustrations for describing a coding element C according to a first embodiment. The coding element C is used in a spectroscopic system that generates an image in each of a plurality of wavelength bands included in a wavelength band to be imaged. In the present specification, the wavelength band to be imaged may be referred to as a target wavelength band. The coding element C is disposed in an optical path of light from an object. The coding element C modulates the intensity of incident light at each wavelength and outputs the result. This process of the coding element C is referred to as coding in the present specification. The coding element C corresponds to a first coding element according to the present disclosure.

FIG. 1A schematically illustrates the configuration of the coding element C. The coding element C includes a plurality of regions arrayed two-dimensionally. Each of the regions is formed of a member having a light-transmitting property and has an individually set spectral transmittance. Here, the spectral transmittance means a wavelength distribution of an optical transmittance. The spectral transmittance is expressed by a function $T(\lambda)$, in which $\lambda$ represents the wavelength of incident light. The spectral transmittance $T(\lambda)$ can take a value no less than 0 and no greater than 1. Although FIG. 1A illustrates 48 rectangular regions arrayed in six rows by eight columns, in an actual use, a greater number of regions can be provided. The number of regions can, for example, be equivalent to the number of pixels (e.g., several hundred thousand to several ten million) of a typical image sensor. In one example, the coding element C can be disposed immediately above an image sensor such that each region corresponds to (opposes) one of the pixels in the image sensor.

Figure 1B:
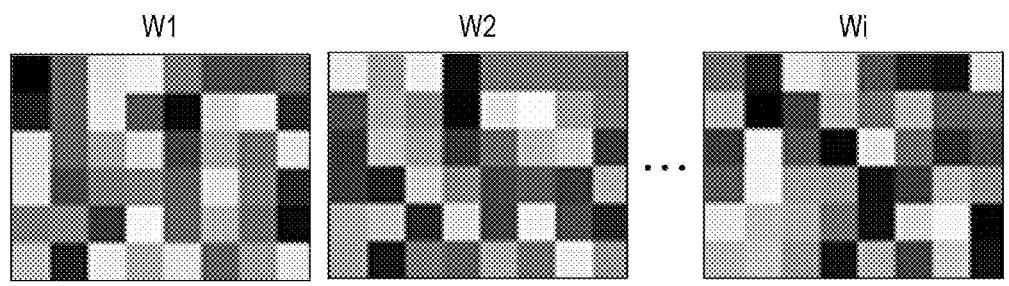
FIG. 1B illustrates an example of the spatial distribution of the transmittance of light in each of a plurality of wavelength bands W1, W2, . . . , and Wi included in a target wavelength band of the coding element C according to the first embodiment.

FIG. 1B illustrates an example of the spatial distribution of the transmittance of light in each of a plurality of wavelength bands W1, W2, . . . , and Wi included in a target wavelength band. In FIG. 1B, the difference in shade among the regions (cells) represents the difference in the transmittance. A lighter region has a higher transmittance, and a darker region has a lower transmittance. As illustrated in FIG. 1B, the spatial distribution of the optical transmittance differs in different wavelength bands.

Figure 1C:
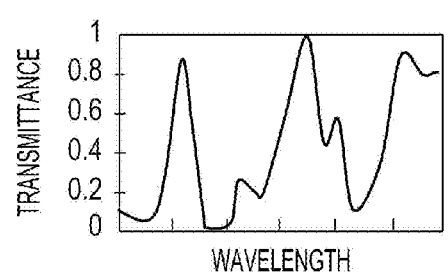
FIG. 1C illustrates an example of the spectral transmittance in a region A1 of the coding element C according to the first embodiment.
Figure 1D:
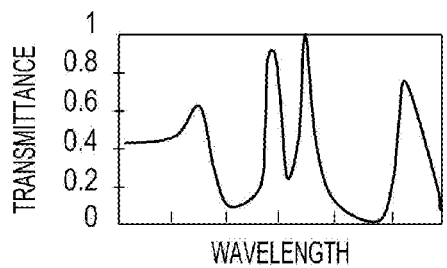
FIG. 1D illustrates an example of the spectral transmittance in a region A2 of the coding element C according to the first embodiment.

FIGS. 1C and 1D are graphs illustrating examples of the spectral transmittance in two regions A1 and A2, respectively, in the coding element C. In each graph, the horizontal axis represents the wavelength, and the vertical axis represents the optical transmittance. The spectral transmittance is normalized such that the optical transmittance in each region has a maximum value of 1 and a minimum value of 0. The spectral transmittance in the region A1 differs from the spectral transmittance in the region A2. In this manner, the spectral transmittance in the coding element C differs in different regions. However, it is not necessary that every region have a different spectral transmittance. It is sufficient that at least some (two or more) of the plurality of regions in the coding element C have mutually different spectral transmittances. In one example, the number of patterns of the spectral transmittances in the plurality of regions included in the coding element C can be equal to or greater than the number i of the wavelength bands included in the target wavelength band. Typically, the coding element C is designed such that more than half of the regions have mutually different spectral transmittances.

Figure 2A:
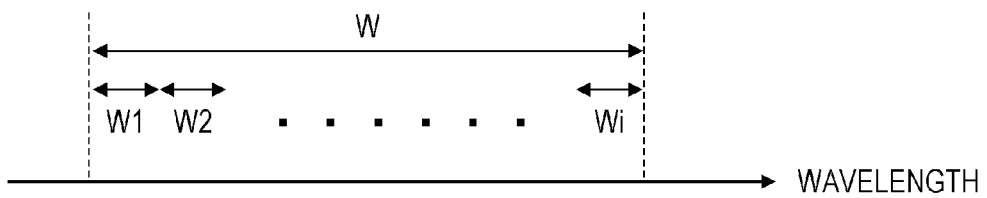
FIG. 2A is an illustration for describing a relation between the target wavelength band W and the plurality of wavelength bands W1, W2, . . . , and Wi included in the target wavelength band W.

FIG. 2A is an illustration for describing a relation between the target wavelength band W and the plurality of wavelength bands W1, W2, . . . , and Wi included in the target wavelength band W. The target wavelength band W can be set to a variety of ranges in accordance with the intended use. The target wavelength band W can, for example, be a visible-light wavelength band (approximately 400 nm to approximately 700 nm), a near-infrared wavelength band (approximately 700 nm to approximately 2500 nm), a near-ultraviolet wavelength band (approximately 10 nm to approximately 400 nm), a mid-infrared band, a far-infrared band, or a radio-wave band including terahertz waves and millimeter waves. In this manner, a wavelength band to be used is not limited to a visible-light band. In the present specification, aside from visible light, non-visible rays including near-ultraviolet rays, near-Infrared rays, and radio waves are also referred to as light for convenience.

Figure 2B:
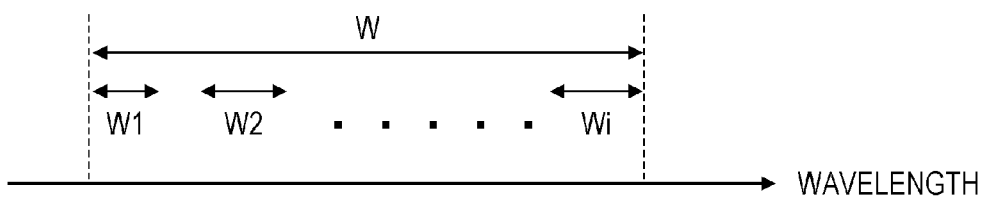
FIG. 2B illustrates an example in which the band widths vary among the wavelength bands and a gap is present between two adjacent wavelength bands.

In the present embodiment, as illustrated in FIG. 2A, provided that i is any integer no less than 4, wavelength bands obtained by equally dividing the target wavelength band W by i are designated as the wavelength bands W1, W2, . . . , and Wi. The present embodiment, however, is not limited to this example. The plurality of wavelength bands included in the target wavelength band W may be set as desired. For example, the widths of the wavelength bands (referred to as band widths) may vary among the wavelength bands. A gap may be present between adjacent wavelength bands. FIG. 2B illustrates an example in which the band widths vary among the wavelength bands and a gap is present between two adjacent wavelength bands. In this manner, the plurality of wavelength bands may mutually differ and can be determined as desired. The number i into which the wavelength band is divided may be 3 or less.

Figure 3A:
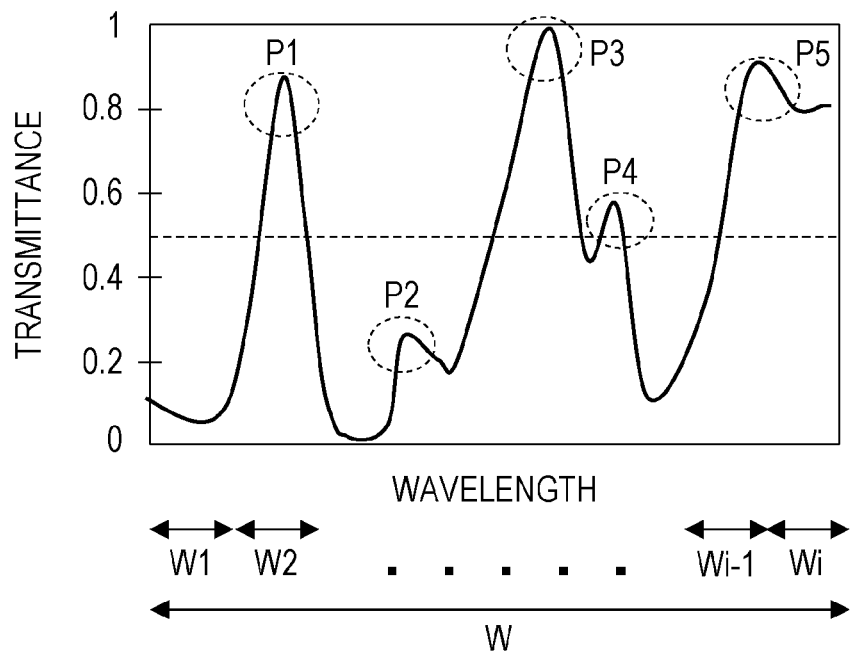
FIG. 3A is an illustration for describing the characteristics of the spectral transmittance in a given region of the coding element C.

FIG. 3A is an illustration for describing the characteristics of the spectral transmittance in a given region of the coding element C. The spectral transmittance in this example has a plurality of local maxima P1 to P5 and a plurality of local minima with respect to the wavelengths within the target wavelength band W. The wavelength distribution of the optical transmittance illustrated in FIG. 3A is normalized such that the optical transmittance within the target wavelength band W has a maximum value of 1 and a minimum value of 0. In this example, the spectral transmittance has local maxima in the wavelength bands W2, Wi-1, and so on. In this manner, in the present embodiment, the spectral transmittance in each region has local maxima in a plurality of (at east two) wavelength bands among the plurality of wavelength bands W1 to Wi. As can be seen from FIG. 3A, the local maxima P1, P3, P4, and P5 are no less than 0.5.

As described thus far, the optical transmittance of each region varies depending on the wavelength. Therefore, of incident light, the coding element C transmits components in certain wavelength bands in a large amount and does not transmit components in other wavelength bands in a large amount. For example, light in k wavelength bands (k is an integer that satisfies 2≤k<i) among the i wavelength bands has a transmittance of greater than 0.5 (50%), and light in the remaining i-k wavelength bands has a transmittance of less than 0.5 (50%). If the incident light is white light that equally includes the wavelength components of the entire visible light, the coding element C modulates the incident light hi each region into light that has a plurality of intensity peaks that are discrete with respect to the wavelengths, superimposes the obtained light of multiple wavelengths, and outputs the result.

Figure 3B:
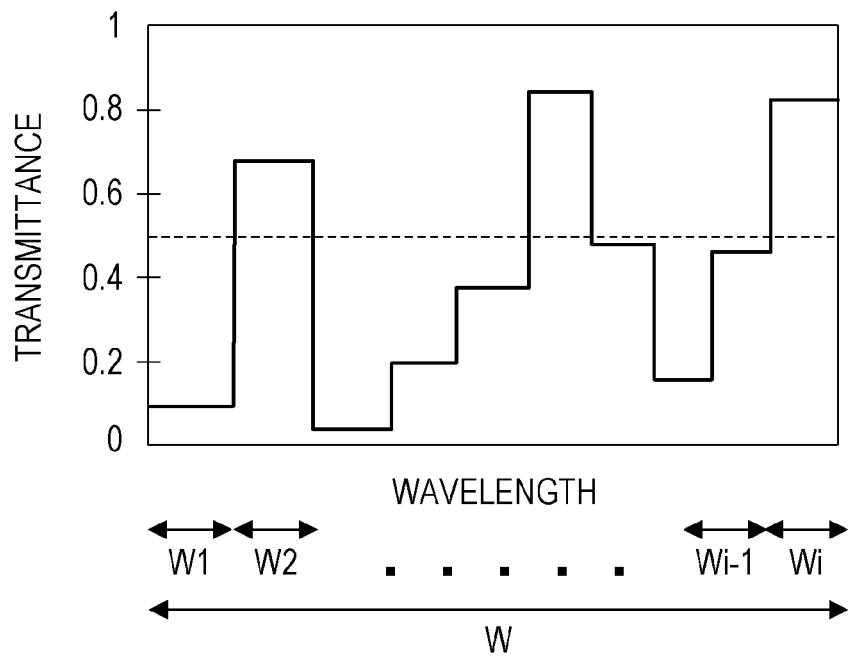
FIG. 3B illustrates a result of averaging the spectral transmittance illustrated in FIG. 3A in each of the wavelength bands W1, W2, . . . , and Wi.

FIG. 3B illustrates, as an example, a result of averaging the spectral transmittance illustrated in FIG. 3A in each of the wavelength bands W1, W2, . . . , and Wi. The averaged transmittance is obtained by integrating the spectral transmittance $T(\lambda)$ in each wavelength band and by dividing the result by the width of the corresponding wavelength band (band width). In the present specification, the value of the transmittance averaged in each wavelength band in this manner is referred to as the transmittance in the corresponding wavelength band. In this example, the transmittance is saliently high in the three wavelength bands having the local maxima P1, P3, and P5. In particular, the transmittance exceeds 0.8 (80%) in the wavelength bands having the local maxima P3 and P5.

The resolving power of the spectral transmittance in each region in the wavelength direction can be set approximately to a desired wavelength band width (band width). In other words, in a wavelength range that includes one local maximum (peak) in the spectral transmittance curve, the width of the range that takes a value no less than a mean value of a local minimum closest to the stated local maximum and the stated local maximum can be set approximately to a desired wavelength band width (band width). In this case, if the spectral transmittance is resolved into frequency components by using the Fourier transform or the like, the value of a frequency component corresponding to the stated wavelength band becomes relatively large.

As illustrated in FIG. 1A, typically, the coding element C is divided into a plurality of regions (cells) of a lattice pattern. These cells have mutually different spectral transmittance characteristics. The wavelength distribution and the spatial distribution of the optical transmittance in each region of the coding element C can, for example, be a random distribution or a quasi-random distribution.

The random distribution and the quasi-random distribution are considered as follows. First, each region of the coding element C can be considered as a vector element having a value of, for example, 0 to 1 in accordance with the optical transmittance. Here, when the transmittance is 0 (0%), the value of the vector element is 0; and if the transmittance is 1 (100%), the value of the vector element is 1. In other words, a set of regions arrayed in a line in a row direction or a column direction can be considered as a multi-dimensional vector having a value of 0 to 1. Therefore, it can be said that the coding element C includes a plurality of multi-dimensional vectors in the row direction or the column direction. In this case, the random distribution means that any two multi-dimensional vectors are independent from each other (they are not parallel). Meanwhile, the quasi-random distribution means that a configuration in which multi-dimensional vectors are not independent is included in some of the multi-dimensional vectors. Therefore, in the random distribution and the quasi-random distribution, a vector having, as its elements, the values of the transmittance of light in a first wavelength band in respective regions belonging to a set of regions arrayed in a single row (or column) included in the plurality of regions is independent from a vector having, as its elements, the values of the transmittance of light in the first wavelength band in respective regions belonging to another set of regions arrayed in a row (or column). In a similar manner, with respect to a second wavelength band that differs from the first wavelength band, a vector having, as an element, the value of the transmittance of light in the second wavelength band in each region belonging to a set of regions arrayed in a single row (or column) included in the plurality of regions is independent from a vector having, as an element, the value of the transmittance of light in the second wavelength band in each region belonging to another set of regions arrayed in a row (or column).

The random distribution may be defined by an autocorrelation function defined by the following expression (1).

$$y(i, j, k) = \sum_{l=1}^{L} \sum_{m=1}^{M} \sum_{n=1}^{N} x(l, m, n) \cdot x(l+i, m+j, n+k) \quad (1)$$

Provided that the coding element C is formed of a total of M×N rectangular regions arrayed in a matrix of M in the longitudinal direction by N in the lateral direction and that the number of spectral images generated by a spectroscopic system that includes the coding element C is L, $x(l,m,n)$ represents the optical transmittance in the lth wavelength band of a rectangular region that is disposed at the mth position in the longitudinal direction and the nth position in the lateral direction. In addition, $i=-(L-1), \ldots, -1, 0, 1, \ldots,$ and $(L-1)$; $j=-(M-1), \ldots, -1, 0, 1, \ldots,$ and $(M-1)$; and $k=-(N-1), \ldots, -1, 0, 1, \ldots, (N-1)$. When $m<1$, $n<1$, $l<1$, $m>M$, $n>N$, and $l>L$; $x(l,m,n)=0$. The autocorrelation function $y(i,j,k)$ indicated by the above expression (1) is a function that expresses, with i, j, and k being variables, a correlation value between the optical transmittance $x(l,m,n)$ in the lth wavelength band in a rectangular region disposed at the mth position in the longitudinal direction and the nth position in the lateral direction and the optical transmittance $x(l+i,m+j,n+k)$ in a wavelength band offset by i from the lth wavelength band in a rectangular region that is offset by j in the longitudinal direction and k in the lateral direction from the aforementioned rectangular region. In this case, the random distribution as used in the present disclosure means, for example, that the autocorrelation function $y(i,j,k)$ indicated by the above expression (1) has a local maximum at $y(0,0,0)$ and does not have a local maximum at the other coordinates. Specifically, it means that the auto-correlation function $y(i,j,k)$ monotonously decreases as i changes from $i=0$ to $(L-1)$ and to $-(L-1)$, monotonously decreases as j changes from $j=0$ to $(M-1)$ and to $-(M-1)$, and monotonously decreases as k changes from $k=0$ to $(N-1)$ and to $-(N-1)$. In addition, the random distribution may have, aside from the local maximum at $y(0,0,0)$, local maxima at no greater than L/10 positions in the i-axis direction, local maxima at no greater than M/10 positions in the j-axis direction, and local maxima at no greater than N/10 positions in the k-axis direction.

When the coding element C is disposed in the vicinity of or immediately above the image sensor, the interval (cell pitch) among the plurality of regions in the coding element C may substantially match the pixel pitch of the image sensor. With this configuration, the resolution of an image of coded light emitted from the coding element C substantially matches the resolution of the pixels. By allowing light that has passed through each cell to be incident only on a single corresponding pixel, the operation described later can be simplified. If the coding element C is disposed so as to be spaced apart from the image sensor, the cell pitch may be reduced in accordance with the distance therebetween.

In the example illustrated in FIGS. 1A to 1D, a gray-scale transmittance distribution in which the transmittance in each region can take any value that is no less than 0 and no greater than 1 is assumed. However, an embodiment is not limited to the gray-scale transmittance distribution. For example, as in a second embodiment described later, a binary-scale transmittance distribution in which the transmittance in each region can take a value of either substantially 0 or substantially 1 may be employed. With the binary-scale transmittance distribution, each region transmits a large portion of light in at least two wavelength bands among the plurality of wavelength bands included in the target wavelength band and does not transmit (blocks) a large portion of light in the remaining wavelength bands. Here, a large portion corresponds to approximately 80% or more.

Some (e.g., half) of the entire cells may be replaced with transparent regions. Such transparent regions transmit light in the entire wavelength bands W1 to Wi included in the target wavelength band substantially equally at a high transmittance (e.g., 0.8 or more). In such a configuration, the plurality of transparent regions can be disposed, for example, in a checkered pattern. In other words, in each of the two array directions (the lateral direction and the longitudinal direction in FIG. 1A) of the plurality of regions in the coding element C, regions whose optical transmittances vary depending on the wavelength and the transparent regions are arrayed in an alternating manner.

The coding element C can be constituted by at least one selected from the group consisting of a multilayer film, an organic material, a diffraction grating structure, and a microstructure containing metal. In a case in which a multilayer film is used, for example, a dielectric multilayer film or a multilayer film that includes a metal layer can be used. In this case, the cells are formed such that at least one selected from the group consisting of the thickness of the multilayer film, the material thereof, and the order in which the layers are stacked differs in different cells. Thus, different spectral characteristics can be achieved in different cells. By using a multilayer film, sharp rise and fall of the spectral transmittance can be achieved. A configuration in which an organic material is used can be implemented by varying the pigment or dyestuffs to be contained in different cells or by stacking layers of different kinds of materials. A configuration in which the diffraction grating structure is used can be implemented by providing a diffraction structure in which the diffraction pitch or depth differs in different cells. In a case in which a microstructure containing metal is used, the microstructure can be fabricated by utilizing dispersion caused by the plasmon effect.

Second Embodiment

Figure 4:
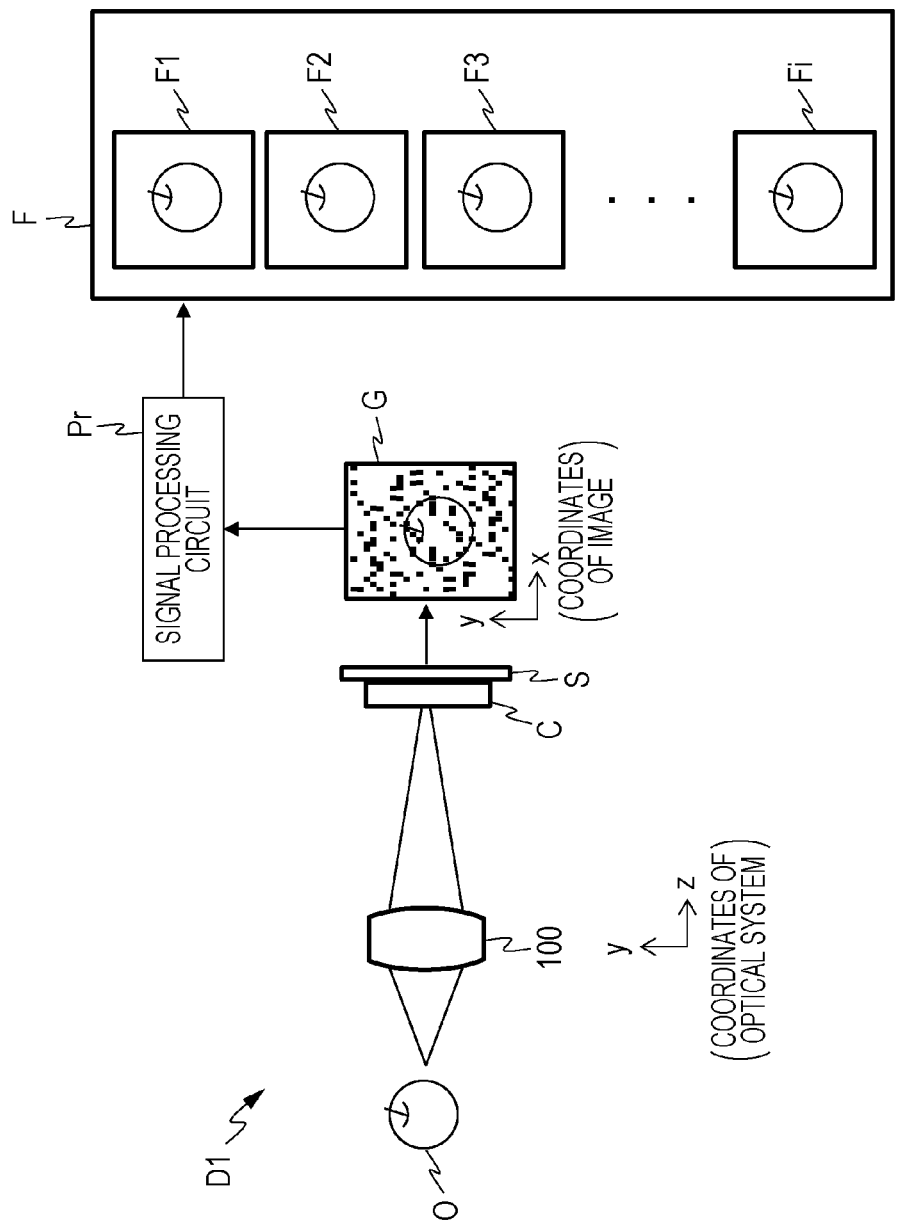
FIG. 4 is a schematic diagram illustrating an imaging apparatus D1 according to a second embodiment of the present disclosure.

FIG. 4 is a schematic diagram illustrating an imaging apparatus D1 according to a second embodiment. The imaging apparatus D1 according to the present embodiment includes an imaging optical system 100, a coding element C, and an image sensor S. The coding element C is identical to the coding element C described in the first embodiment. Thus, detailed descriptions of content that is similar to the content of the first embodiment will be omitted.

FIG. 4 also depicts a signal processing circuit Pr that processes an image signal output from the image sensor S. The signal processing circuit Pr may be incorporated into the imaging apparatus D1 or may be a constituent element of a signal processing device that is electrically connected to the imaging apparatus D1 with a cable or wirelessly. The signal processing circuit Pr estimates a plurality of images F (hereinafter, also referred to as spectrally separated images or multi-wavelength images) that are separated in the respective wavelength bands of light from an object O, on the basis of an image G acquired by the image sensor S.

The imaging optical system 100 includes at least one imaging lens. Although FIG. 4 depicts the imaging optical system 100 as a single lens, the imaging optical system 100 may be constituted by a combination of a plurality of lenses. The imaging optical system 100 forms an image on an imaging surface of the image sensor S.

The coding element C is disposed in the vicinity of or immediately above the image sensor S. Here, being disposed in the vicinity means that the coding element C is disposed in the proximity of the image sensor S such that a sufficiently sharp image of the light from the imaging optical system 100 is formed on the surface of the coding element C. Being disposed immediately above means that the coding element C and the image sensor S are dose to each other with little gap present therebetween. The coding element C and the image sensor S may be integrated into a unit. The coding dement C is a mask having a spatial distribution of an optical transmittance. The coding element C transmits light that has passed through the imaging optical system 100 and is incident on the coding element C while modulating the intensity of that light.

Figure 5A:
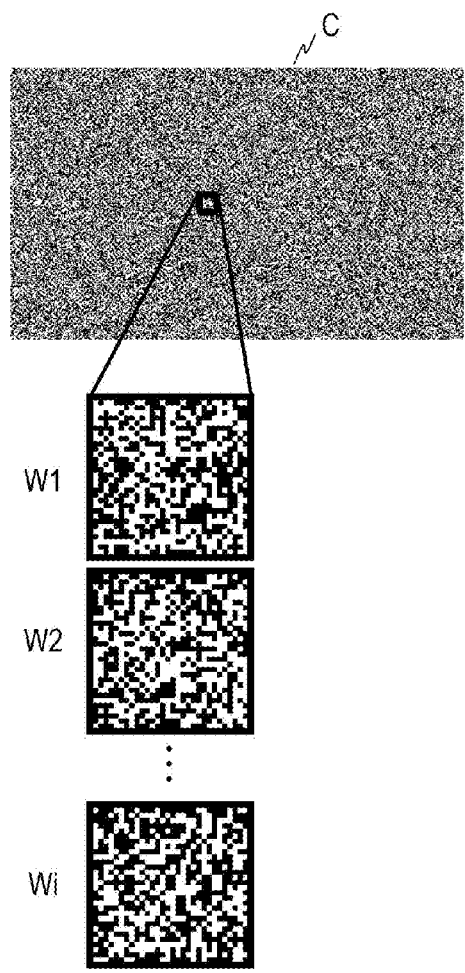
FIG. 5A illustrates an example of the transmittance distribution of the coding element C according to the present embodiment.

FIG. 5A illustrates an example of the transmittance distribution of the coding element C according to the present embodiment. This example corresponds to the binary-scale transmittance distribution described above. In FIG. 5A, the black portion indicates a region that transmits almost no light (referred to as a light-blocking region), and the white portion indicates a region that transmits light (referred to as a light-transmitting region). In this example, the optical transmittance of the white portion is substantially 100%, and the optical transmittance of the black portion is substantially 0%. The coding element C is divided into a plurality of rectangular regions, and each rectangular region is either a light-transmitting region or a light-blocking region. The two-dimensional distribution of the light-transmitting regions and the light-blocking regions in the coding element C can, for example, be a random distribution or a quasi-random distribution.

The random distribution and the quasi-random distribution are considered in a manner similar to the one described above. First, each region in the coding element C can be considered as a vector element having a value of, for example, 0 to 1 in accordance with the optical transmittance. In other words, a set of regions arrayed in a column can be considered as a multi-dimensional vector having a value of 0 to 1. Therefore, it can be said that the coding element C includes a plurality of multi-dimensional vectors arranged in the row direction. In this case, the random distribution means that any two multi-dimensional vectors are independent from each other (they are not parallel). Meanwhile, the quasi-random distribution means that a configuration in which multi-dimensional vectors are not independent is included in some of the multi-dimensional vectors.

It can be said that the coding process by the coding element C is a process of performing marking for separating images of light at respective wavelengths. As long as such marking is possible, the distribution of the transmittance may be set as desired. In the example illustrated in FIG. 5A, the ratio of the number of the black portions to the number of the white portions is 1 to 1, but an embodiment is not limited to this ratio. For example, the distribution may be skewed such that the ratio of the number of the white portions to the number of the black portions is 1 to 9.

Figure 5B:
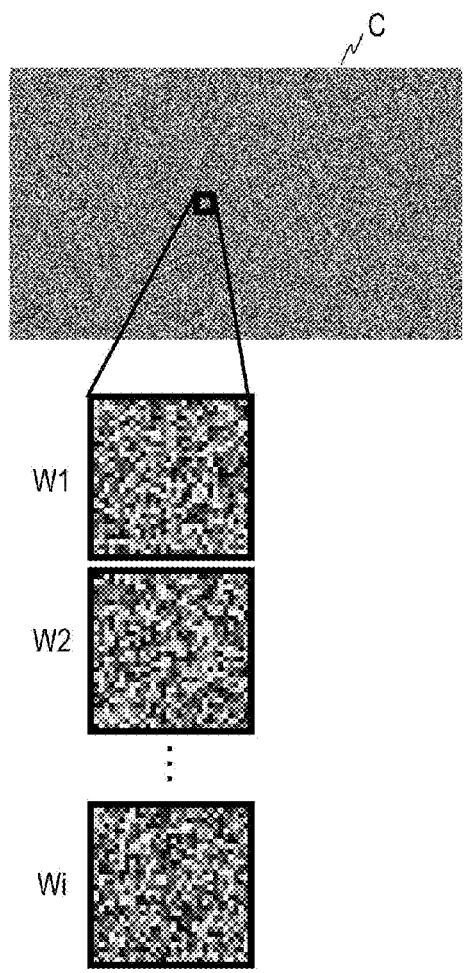
FIG. 5B illustrates another configuration example of the coding element C.

FIG. 5B illustrates another configuration example of the coding element C. This example corresponds to a mask having the gray-scale transmittance distribution described above. In this case, each region in the coding element C has a transmittance value at three or more levels in accordance with the wavelength bands, as in the configuration illustrated in FIG. 1B.

As illustrated in FIGS. 5A and 5B, the coding element C has different transmittance spatial distributions in different wavelength bands W1, W2, . . . , and Wi. However, the transmittance spatial distributions in the respective wavelength bands may coincide with one another when translated in the spatial direction.

Figure 6A:
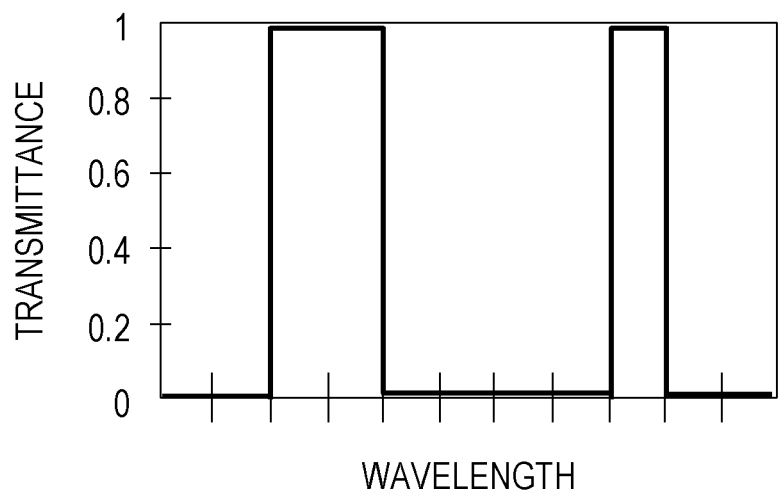
FIG. 6A illustrates, in approximation, the spectral transmittance in a given region of the coding element C having the binary-scale transmittance distribution illustrated in FIG. 5A.
Figure 6B:
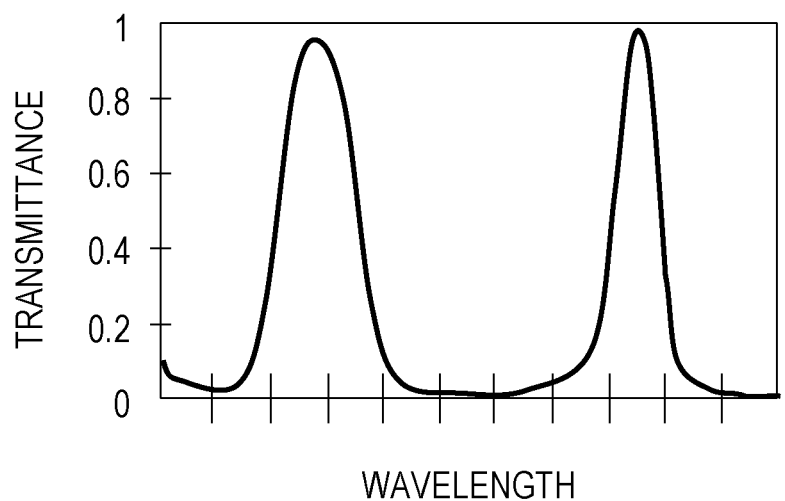
FIG. 6B illustrates an example of the spectral transmittance in a given region of the coding element C having the binary-scale transmittance distribution illustrated in FIG. 5A.

FIG. 6A illustrates, in approximation, the spectral transmittance in a given region of the coding element C that has the binary-scale transmittance distribution illustrated in FIG. 5A. The region having the binary-scale transmittance ideally has a spectral transmittance as illustrated in FIG. 6A. In this example, the spectral transmittance has local maxima in three wavelength bands among the plurality of wavelength bands (each wavelength band is expressed by the interval between the gradations) included in the target wavelength band. In reality, the spectral transmittance is not like the ideal spectral transmittance as illustrated in FIG. 6A, but results in a continuous spectral transmittance as illustrated in FIG. 6B. Even with the spectral transmittance as illustrated in FIG. 6B, by approximating the transmittance in a given wavelength band to substantially 1 when the value obtained by integrating the transmittance in each wavelength band exceeds a predetermined threshold value, the spectral transmittance can be regarded as the spectral transmittance illustrated in FIG. 6A.

Such information pertaining to the transmittance distribution of the coding element C is acquired in advance as design data or through measured calibration and is used in an operation process, which will be described later.

The image sensor S is a monochrome image sensor having a plurality of light-sensor cells (also referred to as pixels in the present specification) that are arrayed two-dimensionally. The image sensor S can, for example, be a charge-coupled device (CCD) sensor, a complementary metal-oxide semiconductor (CMOS) sensor, an infrared array sensor, a terahertz array sensor, or a millimeter-wave array sensor. A light-sensor cell can, for example, be constituted by a photodiode. The image sensor S does not need to be a monochrome image sensor. For example, a color image sensor having a filter of R/G/B, R/G/B/IR, or R/G/B/W may also be used. With the use of a color image sensor, the amount of information pertaining to the wavelengths can be increased, and the accuracy of reconstructing the spectrally separated images F can be increased. However, if a color image sensor is used, the amount of information in the spatial direction (x-, y-directions) is reduced, and thus there is a trade-off between the amount of information pertaining to the wavelengths and the resolution. The range of wavelengths to be acquired (target wavelength band) may be determined as desired, and the target wavelength band is not limited to a wavelength range of visible light and may be a wavelength range of ultraviolet, near-infrared, mid-infrared, far-infrared, microwaves, or radio waves.

The signal processing circuit Pr processes an image signal output from the image sensor S. The signal processing circuit Pr can, for example, be implemented by a combination of a computer program with a digital signal processor (DSP), a programmable logic device (PLD) such as a field programmable gate array (FPGA), or a central processing unit (CPU) and a graphics processing unit (GPU). Such a computer program is stored in a recording medium such as a memory, and as the CPU executes the program, the operation process described later can be executed. As described above, the signal processing circuit Pr may be a component external to the imaging apparatus D1. In such a configuration, a personal computer (PC) electrically connected to the imaging apparatus D1 or a signal processing device, such as a cloud server on the Internet, includes the signal processing circuit Pr. In the present specification, a system that includes such a signal processing device and the imaging apparatus is referred to as a spectroscopic system.

Hereinafter, the operation of the imaging apparatus D1 according to the present embodiment will be described.

FIG. 7 is a flowchart illustrating an overview of a spectroscopic method according to the present embodiment. In step S101, the intensity of incident light is spatially modulated in each wavelength band by using the coding element C. In step S102, an image in which components of light that has passed through the coding element C are superimposed is acquired by the image sensor S. In step S103, a plurality of images in the respective wavelength bands are generated on the basis of the image acquired by the image sensor S and the spatial distribution of the spectral transmittance of the coding element C.

Subsequently, the process of acquiring a captured image G by the imaging apparatus D1 according to the present embodiment will be described.

Light rays from the object O are converged by the imaging optical system 100, and the image of that light rays is coded by the coding element C disposed Immediately preceding the image sensor S. In other words, the intensity of light that passes through the coding element C is modulated in accordance with the spatial distribution of the transmittance at the respective wavelengths in the coding element C. Consequently, images having the coded information are formed on the imaging surface of the image sensor S as a multiplex image in which the stated images are superimposed on one another. In this case, unlike the configuration of the conventional compressed sensing, a dispersive element such as a prism is not used, and thus the image does not shift in the spatial direction. Therefore, a high spatial resolution can be retained even in a multiplex image. A plurality of black dots included in the image G illustrated in FIG. 4 schematically represents low-luminance portions generated through coding. The number and the disposition of the black dots illustrated in FIG. 4 do not reflect the actual number and disposition. In reality, the low-luminance portions can be generated in a greater number than those illustrated in FIG. 4. The information on the multiplex image is converted to a plurality of electric signals (pixel signals) by the plurality of light-sensor cells in the image sensor S, and the captured image G is thus generated.

The imaging apparatus D1 may further include a bandpass filter that transmits only a component in some wavelength bands of incident light rays. This makes it possible to limit a wavelength band to be measured. By limiting the wavelength band to be measured, spectrally separated images F with high separation precision within limited desired wavelengths can be obtained.

Subsequently, a method for reconstructing multi-wavelength spectrally separated images F on the basis of the captured image G and the spatial distribution characteristics of the transmittance at each wavelength of the coding element C will be described. Here, multi-wavelength means, for example, wavelength bands in a number greater than the number of three-color (R/G/B) wavelength bands acquired by a typical color camera. The number of the wavelength bands (hereinafter, also referred to as a spectral band number) is, for example, 4 to approximately 100. Depending on the intended use, the spectral band number may exceed 100.

The data to be obtained is the spectrally separated images F, and the data of the spectrally separated images F is represented by f. When the spectral band number (band number) is represented by w, f is the data in which pieces of image data f1, f2, . . . , and fw of the respective bands are integrated. When the number of pixels in the x-direction of the image data to be obtained is represented by n and the number of pixels in the y-direction is represented by m, each of the pieces of the image data f1, f2, . . . , and fw is a set of two-dimensional data having n×m pixels. Therefore, the data f is three-dimensional data having n×m×w elements. Meanwhile, the number of elements in data g of the captured image G that has been coded and multiplexed by the coding element C and is then acquired is n×m. The data g according to the present embodiment can be expressed by the following expression (2).

$$g = Hf = H \begin{bmatrix} f_1 \\ f_2 \\ \vdots \\ f_w \end{bmatrix} \quad (2)$$

Here, f1, f2, . . . , and fw are each data having n×m elements, and thus the vector on the right-hand side is a one-dimensional vector of n×m×w rows by one column in a strict sense. The vector g is transformed and expressed as a one-dimensional vector of n×m rows by one column and is calculated. The matrix H expresses a transformation for coding the elements f1, f2, . . . , and fw of the vector f with the coding information that differs in the respective wavelength bands, modulating the intensity, and then adding the results. Therefore, H is a matrix of n×m rows by n×m×w columns.

It seems that f can be calculated by solving an inverse problem of the expression (2) when the vector g and the matrix H are given. However, since the number n×m×w of elements of the data f to be obtained is greater than the number n×m of elements of the acquired data g, this problem is an ill-posed problem and cannot be solved as-is. Therefore, the signal processing circuit Pr according to the present embodiment finds a solution through a compressed sensing technique by utilizing the redundancy of the image included in the data f. Specifically, the data f to be obtained is estimated by solving the following expression (3).

$$f' = \underset{f}{\mathrm{argmin}}\{\|g - Hf\|_{l_2} + \tau \Phi(f)\} \quad (3)$$

Here, f' represents the data of estimated f. The first term inside the curly braces in the above expression represents the amount of deviation between the estimation result Hf and the acquired data g, or in other words, is a residual term. Here, although the residual term is a sum of squares, the residual term may be an absolute value, a square root of sum of squares, or the like. The second term inside the curly braces is a regularization term (or a stabilization term), which will be described later. The expression (3) is intended to obtain f that minimizes the sum of the first term and the second term. The signal processing circuit Pr converges the solution through a recursive iterative operation and can calculate the final solution f'.

The first term inside the curly braces in the expression (3) corresponds to an operation of finding the sum of squares of a difference between the acquired data g and Hf obtained by subjecting f in the estimation process to a system transformation by the matrix H. The expression $\phi(f)$ in the second term is a constraint in the regularization of f and is a function that reflects sparse information of the estimated data. The expression acts to smooth or stabilize the estimated data. The regularization term can, for example, be represented by the discrete cosine transform (DCT) of f, the wavelet transform, the Fourier transform, the total variation (TV), or the like. For example, if the total variation is used, stable estimated data in which an influence of noise of the observation data g is suppressed can be acquired. The sparseness of the object O in the space of each regularization term differs depending on the texture of the object O. A regularization term in which the texture of the object O becomes sparser in the space of the regularization term may be selected. Alternatively, a plurality of regularization terms may be included in an operation. The letter $\tau$ is a weighting factor, and as the value of $\tau$ is greater, the amount of redundant data to be reduced becomes greater (compression rate increases); and as the value of $\tau$ is smaller, the convergence toward the solution is reduced. The weighting factor $\tau$ is set to an appropriate value such that f converges to a certain degree and is not overcompressed.

Here, although an operation example in which the compressed sensing indicated in the expression (3) is illustrated, another technique may be employed to find a solution. For example, another statistical method, such as a maximum likelihood estimation method and a Bayes estimation method, can also be used. In addition, the number of the spectrally separated images F may be set to any number, and each wavelength band may also be set as desired.

As described thus far, in the present embodiment, the coding element C whose spectral transmittance characteristics differ in different wavelength bands as illustrated in FIGS. 5A and 5B is used. Thus, as indicated in a first implementation example described later, an occurrence of coma aberration can be suppressed, and a decrease in the resolution due to compressed sensing can be suppressed. According to the present embodiment, the three demands: a high resolution, multiple wavelengths, and moving image capturing (one-shot shooting) can be fulfilled simultaneously. In addition, only two-dimensional data needs to be retained at imaging, and thus the present embodiment is effective in acquiring data of an extended period of time. Although the image sensor and the signal processing circuit according to the present embodiment are configured to acquire a moving image, the image sensor and the signal processing circuit may be configured to acquire only a still image.

Third Embodiment

A third embodiment differs from the second embodiment in that multi-wavelength images are reconstructed by utilizing a blurred state of a coding pattern on an image plane. Hereinafter, detailed descriptions of content that is similar to the content of the second embodiment will be omitted.

FIG. 8A is a schematic diagram illustrating an imaging apparatus D2 according to the present embodiment. Unlike the imaging apparatus D1, in the imaging apparatus D2, a coding element C is disposed so as to be spaced apart from an image sensor S. An image coded by the coding element C is acquired in a blurred state on the image sensor S. Thus, this blur information is stored in advance and is reflected on the system matrix H of the expression (2). Here, the blur information is expressed by a point spread function (PSF). The PSF is a function for defining the degree of spread of a point image to surrounding pixels. For example, in a case in which a point image corresponding to one pixel on an image spreads to a region of k×k pixels surrounding the aforementioned pixel due to blurring, the PSF can be defined as a coefficient group (matrix) indicating an influence on the luminance of each pixel within the stated region. By reflecting the influence of blurring of the coding pattern by the PSF onto the system matrix H, spectrally separated images F can be reconstructed.

The coding element C may be disposed at a desired position, but it is necessary to prevent the coding pattern of the coding element C from spreading too much and disappearing. Therefore, for example, as illustrated in FIG. 8B, the coding element C is preferably disposed in the vicinity of a lens in an imaging optical system 100 that is closest to an object O or in the vicinity of the object O. In particular, an optical system having a wide angle of view has a short focal length. Thus, light rays of the respective angles of view are less likely overlap one another at the aforementioned positions, and the coding pattern is less likely to be blurred on the image sensor S and is more likely to be retained. In addition, if the coding element C is disposed at a position closer to the image sensor S as in the second embodiment, the coding pattern is more likely to be retained, and this is preferable.

FIRST IMPLEMENTATION EXAMPLE

Subsequently, an implementation example of the present disclosure will be described.

Figure 9:
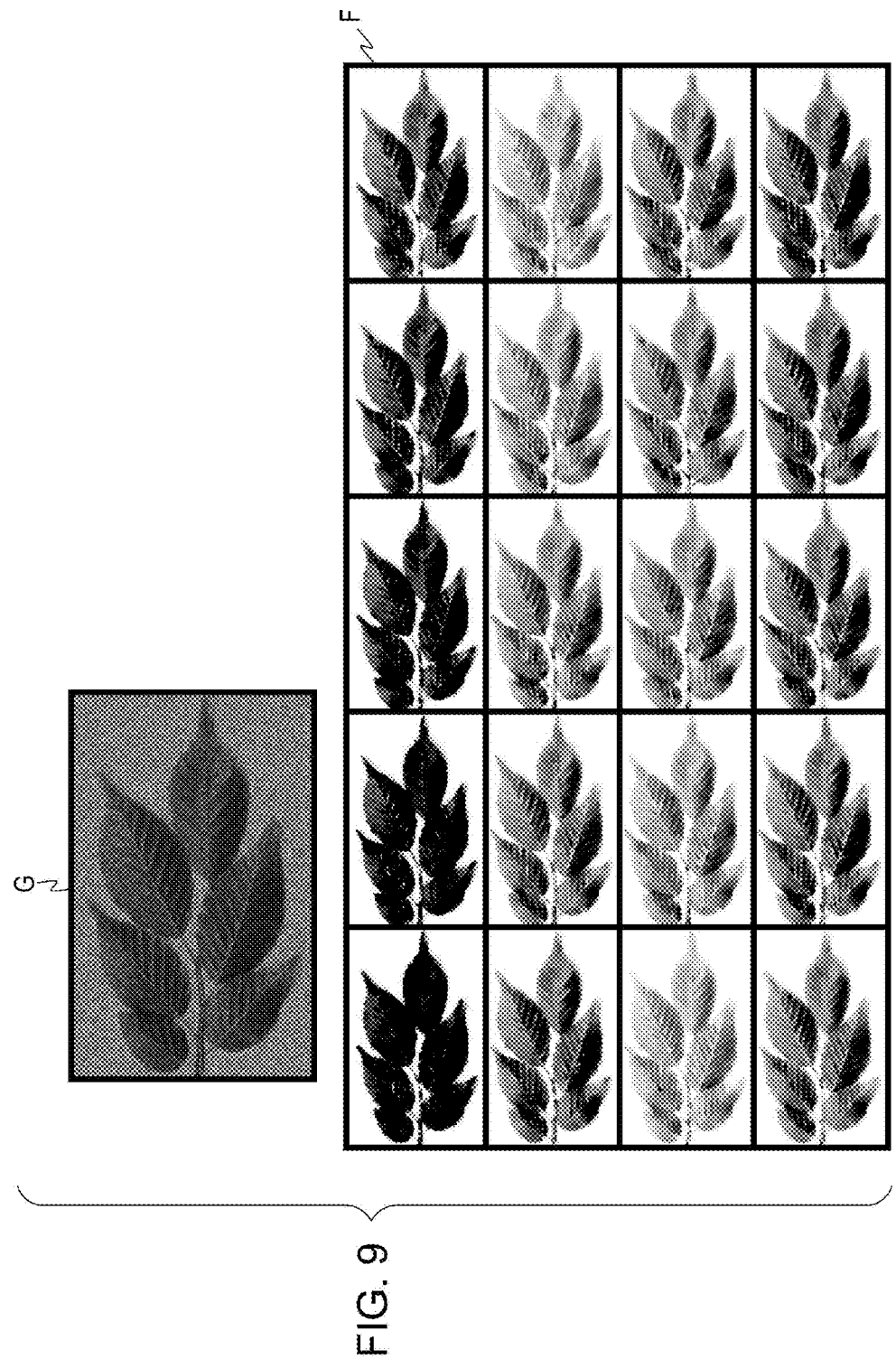
FIG. 9 illustrates an example of a result of reconstructing spectrally separated images F in a first implementation example of the present disclosure.

FIG. 9 illustrates an example of a result of reconstructing spectrally separated images F by using the spectroscopic method according to the present disclosure. Here, as the coding element C, an element having a binary pattern in which a plurality of light-transmitting regions and a plurality of light-blocking regions are arrayed randomly as illustrated in FIG. 5A is used. The optical transmittance of each of the light-transmitting regions is substantially 100%, and the optical transmittance of each of the light-blocking regions is substantially 0%. The configuration of the imaging apparatus according to the second embodiment is employed.

A captured image G is an image having 500×311 pixels in which 20 images coded in the respective wavelength bands by the coding element C are multiplexed.

In the first implementation example, the spectrally separated images F of the 20 wavelength bands are obtained by solving the estimation algorithm of the expression (3) on the basis of the captured image G and the spatial distribution characteristics of the transmittance in the respective wavelength bands of the coding element C. Here, the total variation (TV) is used as a regularization term.

FIRST COMPARATIVE EXAMPLE

As a comparative example, spectrally separated images F to be obtained when, in place of the coding element C, a coding element whose transmittance has almost no wavelength dependence and a dispersive element P that spectrally shifts per pixel in the y-direction are used are reconstructed. The dispersive element is disposed in a path of light that has passed through the coding element and disperses the light into 20 bands only in the y-direction.

Figure 10:
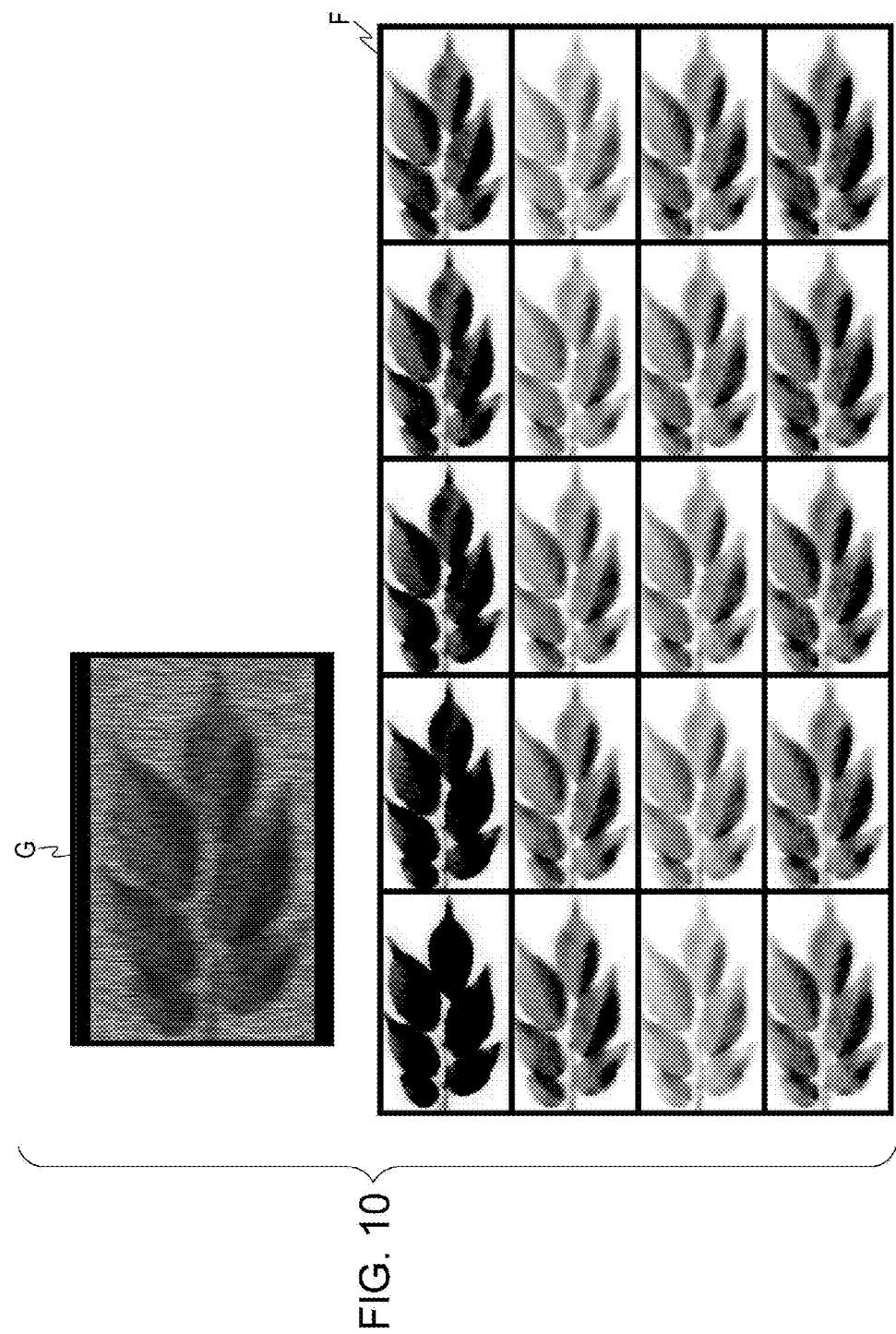
FIG. 10 illustrates an example of a result of reconstructing spectrally separated images F in a first comparative example.

FIG. 10 illustrates the result according to the comparative example. A captured image G illustrated in FIG. 10 is a multiplex image of the images in the respective spectral bands shifted in the y-direction, and thus has a lower resolution than does the captured image G illustrated in FIG. 9. Consequently, the resolution of the spectrally separated images F is also low.

Figure 11:
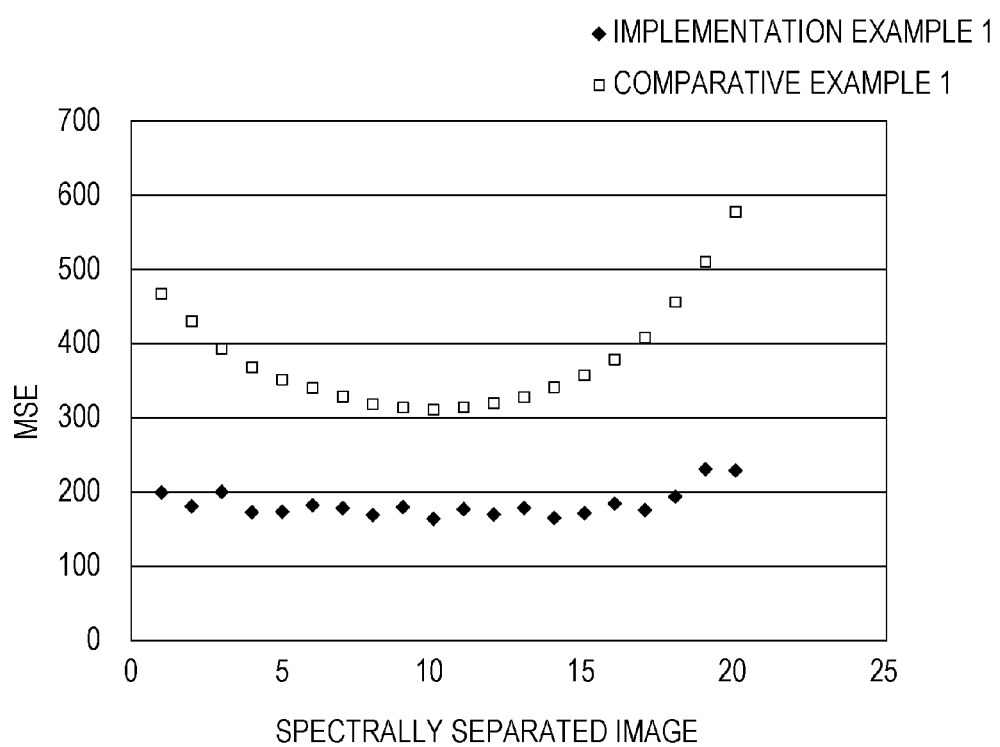
FIG. 11 illustrates a mean squared error (MSE) relative to a correct image in each of the first implementation example and the first comparative example.

FIG. 11 illustrates a mean squared error (MSE) relative to a correct image in each of the first implementation example and the first comparative example. The MSE is expressed by the expression (4) and indicates the mean square error per pixel. As the value is smaller, the spectrally separated images are closer to the correct image.

$$MSE = \frac{1}{n \cdot m} \sum_{i=1}^{n} \sum_{j=1}^{m} (I'_{i,j} - I_{i,j})^2 \tag{4}$$

Here, n and m represent the numbers of pixels, respectively, in the longitudinal direction and in the lateral direction of the image, $I'_{i,j}$ represents the value of the pixel in the ith row and the jth column of a reconstructed image (spectrally separated image), and $I_{i,j}$ represents the value of the pixel in the ith row and the jth column of the correct image. The images used in the present implementation example and the comparative example are each an 8-bit image, and the maximum value of the pixel value is 255.

The horizontal axis in FIG. 11 represents the image number of the reconstructed spectrally separated images F, and the vertical axis represents the value of the MSE. As can be seen from FIG. 11, in a case in which the images are reconstructed through the method of the first implementation example, as compared to the first comparative example, all of the spectrally separated images F have a small MSE value and are close to the correct image. The values of the MSE are in a range from approximately 180 to 200, and it can be understood that the images substantially match the correct image. In contrast, with the first comparative example, which is a conventional method, the values of the MSE are generally high, and it can be understood that the images are notably deteriorated as compared to the correct image. The difference between the MSE in the first implementation example and the MSE in the first comparative example is 1.7 times at a minimum and 2.5 times at a maximum. Thus, the effectiveness of the configuration of the present disclosure can be recognized. This is because, unlike the first comparative example, in the first implementation example, an image shift does not occur in the captured image G and the resolution of the captured image G is high. In addition, the configuration of the present disclosure does not require a relay optical system, and thus the size can be reduced to a great extent. Furthermore, with a spectral shift method in which a prism or the like is used, saturation may occur in a broad range on a line when a high-intensity object such as a light source is imaged. In contrast, the range of saturation is limited in the embodiments of the present disclosure in which an image shift is not carried out, which is thus advantageous.

Fourth Embodiment

Figure 12:
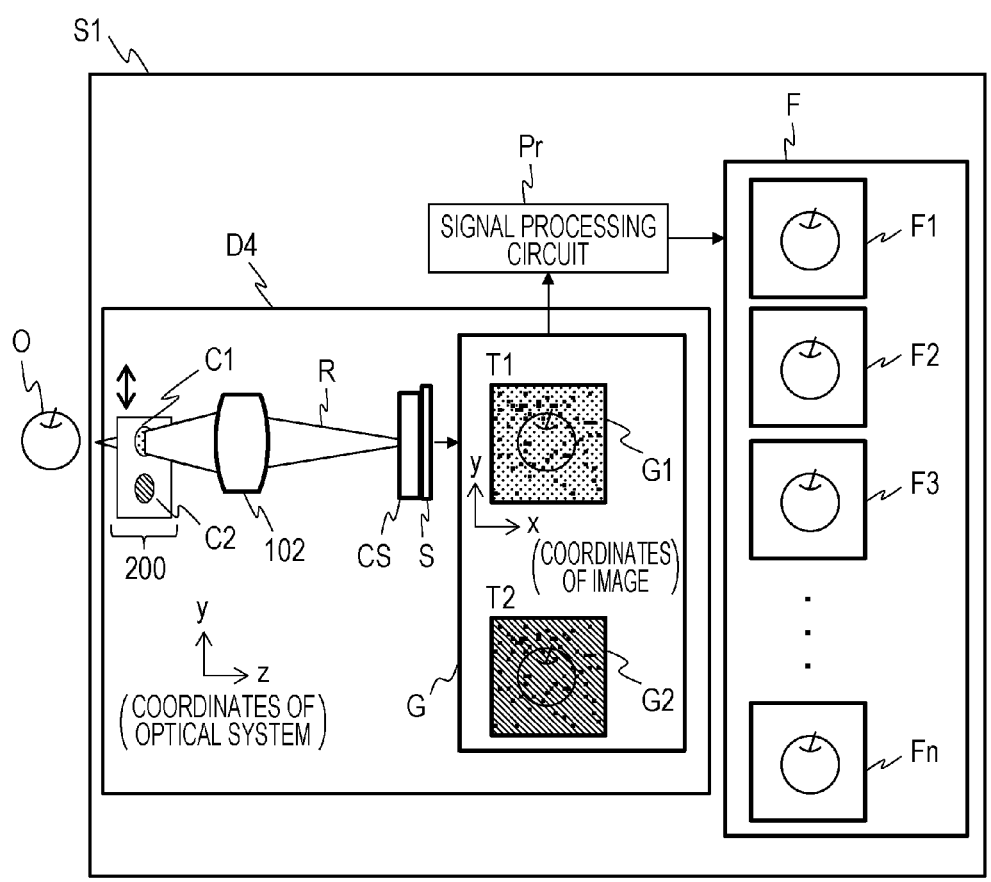
FIG. 12 is a schematic diagram illustrating a spectroscopic system S1 according to a fourth embodiment of the present disclosure.

A fourth embodiment of the present disclosure will be described with reference to FIGS. 12, 13A, 13B, 13C, 13D, 13E, 14A, and 14B. FIG. 12 illustrates a spectroscopic system S1 according to the fourth embodiment. The definition of the spectroscopic system in the present specification will be given later. As illustrated in FIG. 12, the spectroscopic system S1 according to the present embodiment includes an imaging apparatus D4 and a signal processing circuit Pr.

Imaging Apparatus D4

The imaging apparatus D4 according to the present embodiment includes a narrow-band coding device 200, an imaging lens 102, a spatially modulating coding element CS, and an image sensor S. The spatially modulating coding element CS corresponds to the first coding element according to the present disclosure.

Narrow-Band Coding Device 200 The narrow-band coding device 200 is disposed in an optical path of light rays R incident from an object O. Although the narrow-band coding device 200 is disposed between the object O and the imaging lens 102 in the present embodiment, the narrow-band coding device 200 may be disposed between the imaging lens 102 and the spatially modulating coding element CS, which will be described later. The narrow-band coding device 200 includes at least one narrow-band coding element. The narrow-band coding element corresponds to the second coding element according to the present disclosure.

Mode in Which Narrow-Band Coding Device 200 Includes Two Narrow-Band Coding Elements The narrow-band coding device 200 includes a narrow-band coding element C1 and a narrow-band coding element C2. The narrow-band coding device 200 further includes a mechanism for switching between the narrow-band coding element C1 and the narrow-band coding element C2 for each instance of imaging. In the example illustrated in FIG. 12, the narrow-band coding device 200 includes a mechanism for holding the two narrow-band coding elements side by side in the direction perpendicular to the optical axis of the imaging apparatus D4. The narrow-band coding device 200 further includes a slide mechanism for moving the two narrow-band coding elements in the direction perpendicular to the optical axis of the imaging apparatus D4. The mechanism for switching between the two narrow-band coding elements is not limited to the above example. For example, the narrow-band coding device 200 may include a rotation shaft. In this case, the two narrow-band coding elements are disposed at an equal distance from the rotation shaft. As the narrow-band coding device 200 rotates, a narrow-band coding element to be disposed in the optical path is switched.

The narrow-band coding element C1 and the narrow-band coding element C2 each have an optical transmittance that is uniform in the spatial direction. Here, the uniform optical transmittance means that the optical transmittance (or the wavelength distribution of the optical transmittance) is uniform or that an error in the optical transmittance is within 10%.

In addition, the narrow-band coding element C1 and the narrow-band coding element C2 each include a plurality of light-transmitting regions and a plurality of light-blocking regions in the wavelength direction in the wavelength distribution of the optical transmittance. Hereinafter, this will be described in detail with reference to FIGS. 13A and 13B.

Figure 13A:
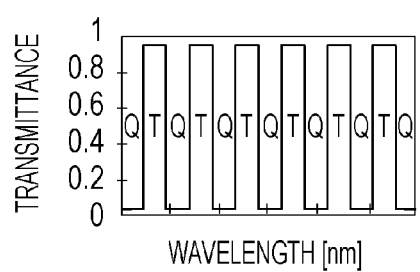
FIG. 13A illustrates an example of the spectral transmittance of a narrow-band coding element in an imaging apparatus D4 illustrated in FIG. 12.
Figure 13C:
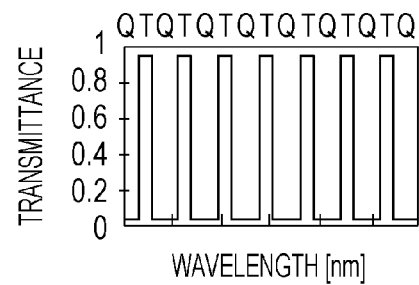
FIG. 13C illustrates yet another example of the spectral transmittance of the narrow-band coding element.
Figure 13B:
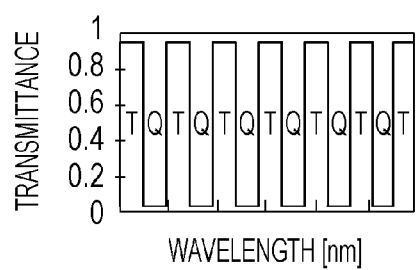
FIG. 13B illustrates another example of the spectral transmittance of the narrow-band coding element in the imaging apparatus D4 illustrated in FIG. 12.

FIGS. 13A and 13B illustrate an example of the spectral transmittance of the narrow-band coding element C1 according to the fourth embodiment. Here, the spectral transmittance corresponds to the wavelength distribution of the optical transmittance. The spectral transmittance is expressed by a function $T(\lambda)$, in which $\lambda$ represents the wavelength of incident light. The spectral transmittance $T(\lambda)$ can take a value no less than 0 and no greater than 1. In the example illustrated in FIGS. 13A and 13B, the spectral transmittance of the narrow-band coding element C1 changes periodically in the wavelength direction. One period of the spectral transmittance includes one each of a transmission wavelength range T in which the optical transmittance is substantially constant at substantially 1 and a light-blocking wavelength range Q in which the optical transmittance is substantially constant at substantially 0. In the present specification, the transmission wavelength range T is defined as a wavelength range in which the optical transmittance is no less than 0.5 and the mean transmittance therewithin is substantially 1. In a similar manner, the light-blocking wavelength range Q is defined as a wavelength range in which the optical transmittance is less than 0.5 and the mean transmittance therewithin is substantially 0. Substantially 1 corresponds to a value that is no less than 0.8, and substantially 0 corresponds to a value no greater than 0.2. The spectral transmittance of the narrow-band coding element desirably has a binary distribution. The binary distribution is a distribution in which the transmittance in the transmission wavelength range T is constant at substantially 1 and the transmittance in the light-blocking wavelength range Q is constant at substantially 0, However, the spectral transmittance does not have to have a binary distribution as long as the mean of the transmittance in the transmission wavelength range T is substantially 1 and the mean of the transmittance in the light-blocking wavelength range Q is substantially 0. The same applies to the narrow-band coding element described hereinafter.

Figure 13D:
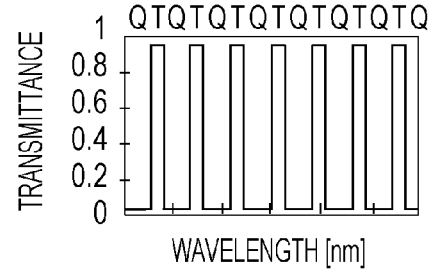
FIG. 13D illustrates yet another example of the spectral transmittance of the narrow-band coding element.
Figure 13E:
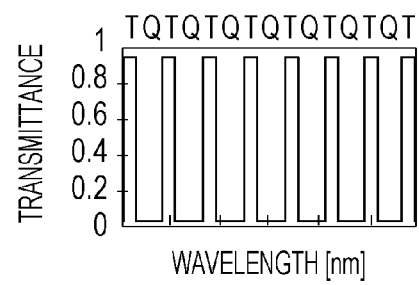
FIG. 13E illustrates yet another example of the spectral transmittance of the narrow-band coding element.

In the example of the spectral transmittance illustrated in FIGS. 13A and 13B, the band widths of the transmission wavelength range T and the light-blocking wavelength range Q are set to be equal to each other, but an embodiment is not limited to this example. As illustrated in FIGS. 13C to 13E, the band width of the transmission wavelength range T may be less than the band width of the light-blocking wavelength range Q. In addition, the spectral transmittance does not have to change periodically. In other words, the plurality of transmission wavelength ranges T in the spectral transmittance may have mutually different band widths. In addition, the plurality of light-blocking wavelength ranges Q in the spectral transmittance may have mutually different band widths.

Figure 14A:
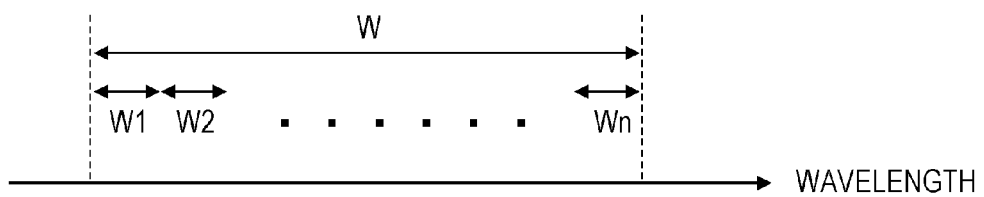
FIG. 14A is an illustration for describing a relation between a target wavelength band W and a plurality of wavelength bands W1, W2, . . . , and Wn included in the target wavelength band W.

FIG. 14A illustrates a relation between a target wavelength band W and a plurality of wavelength bands W1, W2, ..., and Wn included in the target wavelength band W. The target wavelength band W is a wavelength band in which the imaging apparatus D4 is to capture an image. The plurality of wavelength bands W1, W2, ..., and Wn are wavelength bands to be used by the imaging apparatus D4 for image signals. In addition, the signal processing circuit Pr, which will be described later, reconstructs n spectrally separated images F1, F2, ..., and Fn that are separated in the respective wavelength bands W1 W2, ..., and Wn.

The target wavelength band W can be set in a variety of ranges in accordance with the intended use. The target wavelength band W can, for example, be a visible-light wavelength band (approximately 400 nm to approximately 700 nm), a near-infrared wavelength band (approximately 700 nm to approximately 2500 nm), a near-ultraviolet wavelength band (approximately 10 nm to approximately 400 nm), a mid-infrared band, a far-infrared band, or a radio wave range including terahertz waves and millimeter waves. In this manner, the wavelength band to be used in the imaging apparatus D4 is not limited to a visible-light band. In the present specification, aside from visible light, non-visible rays including near-ultraviolet rays, near-infrared rays, and radio waves are also referred to as light for convenience.

Figure 14B:
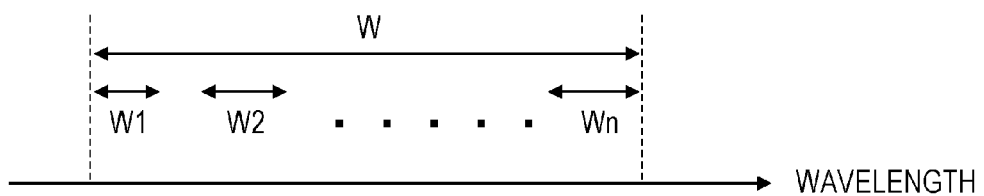
FIG. 14B illustrates an example in which the band widths vary among the wavelength bands and a gap is present between two adjacent wavelength bands.

In the present embodiment, as illustrated in FIG. 14A, with n being any integer of no less than 4, wavelength bands obtained by equally dividing the target wavelength band W by n are designated as the wavelength bands W1, W2, ..., and Wn. However, the setting of the plurality of wavelength bands to be included in the target wavelength band W is not limited to the above example. For example, the widths of the wavelength bands (band widths) may vary. As illustrated in FIG. 14B, the band widths may vary among the wavelength bands, or a gap may be present between two adjacent wavelength bands. In this manner, the plurality of wavelength bands may be set as desired as long as there is no portion in which wavelength bands overlap each other. The number n of the wavelength bands is, for example, 4 to approximately 100, but the number n may exceed 100 depending on the intended use.

In the present embodiment, the width of the transmission wavelength ranges T in the narrow-band coding element C1 and the narrow-band coding element C2 is designed to substantially match the width of the wavelength bands W1, W2, ..., and Wn. The width of each wavelength band is, for example, 20 nm. The width of each wavelength band may be 10 nm, 5 nm, or 1 nm.

Thus, the narrow-band coding element C1 includes a plurality of light-transmitting regions (transmission wavelength ranges T) and a plurality of light-blocking regions (light-blocking wavelength ranges Q) in the wavelength direction in the wavelength distribution of the optical transmittance. The plurality of light-transmitting regions each correspond to one of the wavelength bands W1 W2, ..., and Wn.

FIG. 13B illustrates the spectral transmittance of the narrow-band coding element C2. The spectral transmittance illustrated in FIG. 13B has a distribution in which the distribution of the transmission wavelength ranges T and the light-blocking wavelength ranges Q in the spectral transmittance of the narrow-band coding element C1 illustrated in FIG. 13A is inverted. Therefore, the wavelength range that includes the transmission wavelength ranges T in the spectral transmittance of the narrow-band coding element C1 and the transmission wavelength ranges T in the spectral transmittance of the narrow-band coding element C2 covers the entirety of the plurality of wavelength bands W1, W2, ..., and Wn.

Thus, the narrow-band coding element C1 and the narrow-band coding element C2 have the respective pluralities of light-transmitting regions (transmission wavelength ranges T) in mutually different wavelength bands. In addition, the plurality of light-transmitting regions each correspond to one of the wavelength bands W1, W2, ..., and Wn.

Mode in Which Narrow-Band Coding Device 200 Includes Three Narrow-Band Coding Elements The narrow-band coding device 200 may include three narrow-band coding elements, namely, a narrow-band coding element C11, a narrow-band coding element C12, and a narrow-band coding element C13. Examples of the spectral transmittances of the respective narrow-band coding elements C11, C12, and C13 are illustrated in FIGS. 13C, 13D, and 13E. The three spectral transmittances illustrated in FIGS. 13C, 13D, and 13E each have a periodical distribution in the wavelength direction and a uniform distribution in the spatial direction. In addition, in each of the spectral transmittances, one period includes one each of the transmission wavelength range T and the light-blocking wavelength range Q.

The spectral transmittance of the narrow-band coding element C12 illustrated in FIG. 13D is obtained by shifting the spectral transmittance of the narrow-band coding element C11 illustrated in FIG. 13C by the width of the transmission wavelength range T in the direction in which the wavelength increases. In a similar manner, the spectral transmittance of the narrow-band coding element C13 illustrated in FIG. 13E is obtained by shifting the spectral transmittance of the narrow-band coding element C11 illustrated in FIG. 13C by twice the width of the transmission wavelength range T in the direction in which the wavelength increases. Therefore, the wavelength range that includes the transmission wavelength ranges T in the spectral transmittances of the narrow-band coding element C11, the narrow-band coding element C12, and the narrow-band coding element C13 covers the entirety of the plurality of wavelength bands W1, W2, . . . , and Wn.

In the examples of the spectral transmittances illustrated in FIGS. 13C, 13D, and 13E, the transmission wavelength range T has a width that is half the width of the light-blocking wavelength range Q, but an embodiment is not limited to this example. In a similar manner, the three spectral transmittances have the transmission wavelength ranges T of equal width, but an embodiment is not limited to this example. In addition, the three spectral transmittances have the light-blocking wavelength ranges T of equal width, but an embodiment is not limited to this example. Although the spectral transmittance changes periodically, an embodiment is not limited to this example. In other words, the plurality of transmission wavelength ranges T in one spectral transmittance may have mutually different wavelength band widths. In addition, the plurality of light-blocking wavelength ranges Q in one spectral transmittance may have mutually different wavelength band widths. Thus, it is sufficient that the spectral transmittances of the narrow-band coding element C11, the narrow-band coding element C12, and the narrow-band coding element C13 cover the target wavelength band W when all of the transmission wavelength ranges T in the three spectral transmittances are combined.

Other Modes of Narrow-Band Coding Device 200

The narrow-band coding device 200 may include four or more narrow-band coding elements. In that case, the narrow-band coding elements are designed such that the wavelength range including the transmission wavelength ranges T in the spectral transmittances of the narrow-band coding element covers the entire wavelength bands W1, W2, . . . , Wn.

Figure 15:
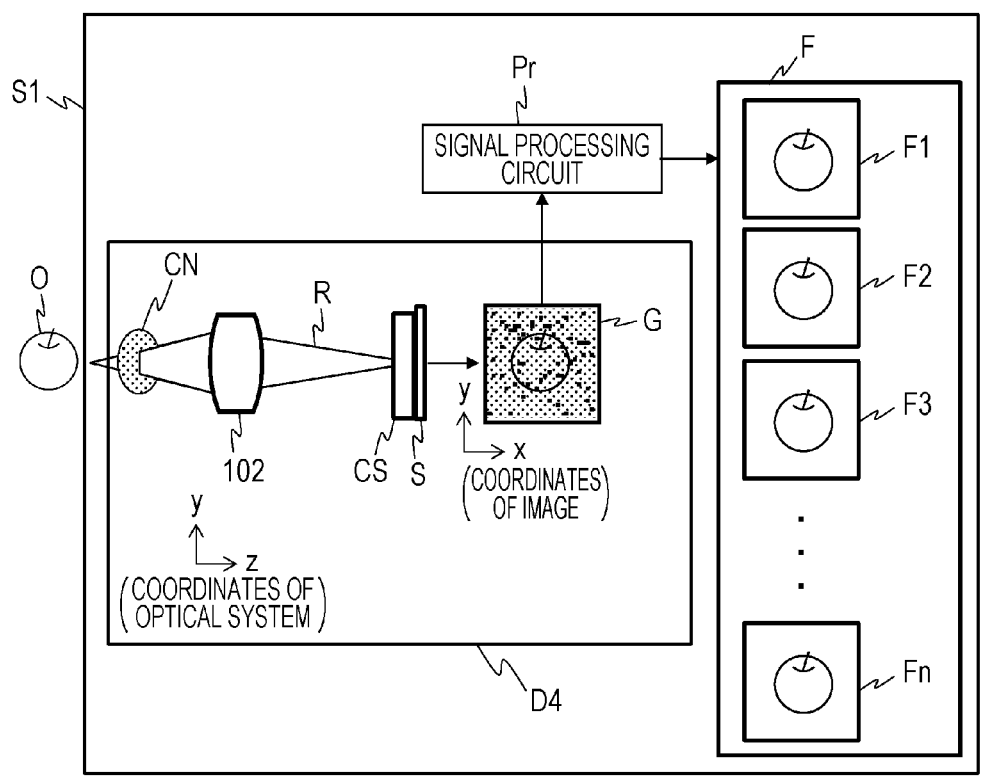
FIG. 15 illustrates another configuration example of the imaging apparatus D4 in the spectroscopic system S1.

Alternatively, as illustrated in FIG. 15, the imaging apparatus D4 may include only one narrow-band coding element CN, in place of the narrow-band coding device 200. In this case, the imaging apparatus D4 uses a wavelength band corresponding to the transmission wavelength range T in the spectral transmittance of the narrow-band coding element CN for an image signal. In other words, the imaging apparatus D4 does not use a wavelength band corresponding to the light-blocking wavelength range Q in the spectral transmittance of the narrow-band coding element CN for an image signal. Therefore, the entirety of the plurality of wavelength bands W1, W2, . . . , and Wn is covered by the transmission wavelength ranges T in the spectral transmittance of the single narrow-band coding element CN.

Structure of Narrow-Band Coding Element

The narrow-band coding element can be constituted by at least one of a multilayer film, an organic material, a diffraction grating structure, and a microstructure containing metal. In a case in which a multilayer film is used, for example, a dielectric multilayer film or a multilayer film that includes a metal layer can be used. By using the multilayer film, sharp rise and fall of the transmittance at a boundary between the transmission wavelength range T and the light-blocking wavelength range Q can be achieved. The configuration in which an organic material is used can be implemented by stacking materials that contain different pigments or dyestuffs. The configuration in which the diffraction grating structure is used can be implemented by providing a diffraction structure in which the diffraction pitch or depth is adjusted. In a case in which a microstructure containing metal is used, the microstructure can be fabricated by utilizing dispersion caused by the plasmon effect.

Imaging Lens 102

The imaging lens 102 converges light from the object O and forms an image on the imaging surface of the image sensor S. In place of the imaging lens 102, an imaging optical system constituted by a combination of a plurality of imaging lenses may be used.

Spatially Modulating Coding Element CS

The spatially modulating coding element CS is disposed in an optical path of light incident from the object O.

Figure 16A:
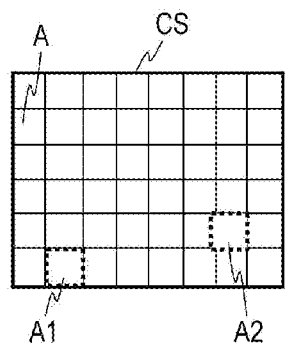
FIG. 16A schematically illustrates a configuration of a spatially modulating coding element CS of the imaging apparatus D4 illustrated in FIG. 12.

The spatially modulating coding element CS includes a plurality of regions arrayed two-dimensionally. For example, as illustrated in FIG. 16A, the spatially modulating coding element CS includes a plurality of regions A divided in a lattice pattern. Each of the regions A is formed by a light-transmitting member. Although FIG. 16A illustrates 48 rectangular regions A arrayed in six rows by eight columns, in an actual use, a greater number of regions A can be provided. The number of the regions A corresponds to the number of pixels in a typical image sensor and can, for example, be approximately several hundred thousand to several ten million. In the present embodiment, the spatially modulating coding element CS is disposed immediately above the image sensor S. In addition, the interval among the plurality of regions A substantially matches the pixel pitch of the image sensor. Thus, light that has passed through a given region A is incident only on one corresponding pixel of the image sensor S. In addition, the spatially modulating coding element CS may be disposed so as to be spaced apart from the image sensor S. In this case, the interval of the regions A may be reduced in accordance with the distance from the image sensor S. Thus, light that has passed through a given region A of the spatially modulating coding element CS can be made to be incident only on one corresponding pixel of the image sensor S.

Figure 16B:
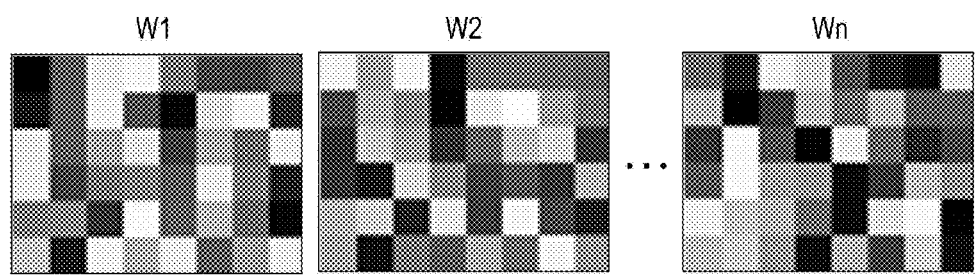
FIG. 16B illustrates an example of the spatial distribution of the transmittance of light in each of the plurality of wavelength bands W1, W2, . . . , and Wi included in the target wavelength band of the spatially modulating coding element CS of the imaging apparatus D4 illustrated in FIG. 12.

FIG. 16B illustrates an example of the spatial distribution of the optical transmittance in the spatially modulating coding element CS. The optical transmittance is indicated for each of the plurality of wavelength bands W1, W2, . . . , and Wn. In FIG. 16B, the difference in the shade of gray among the regions A represents the difference in the optical transmittance. A lighter gray region has a higher optical transmittance, and a darker gray region has a lower optical transmittance. The spatially modulating coding element CS includes, in each of the plurality of wavelength bands W1, W2, . . . , and Wn, a plurality of regions A having an optical transmittance of substantially 1 and a plurality of regions A having an optical transmittance of substantially 0. The spatially modulating coding element CS may further include a plurality of regions A having a third optical transmittance that lies between substantially 0 and substantially 1. The spatially modulating coding element CS is formed by a plurality of light-transmitting regions and a plurality of light-blocking regions that are disposed spatially in each of the plurality of wavelength bands W1, W2, . . . , and Wn. A light-transmitting region is a region A that has an optical transmittance of no less than 0.5 and, for example, has an optical transmittance of substantially 1 or the third optical transmittance. A light-blocking region is a region A that has an optical transmittance of less than 0.5 and, for example, has an optical transmittance of substantially 0. As illustrated in FIG. 16B, the spatial distribution of the plurality of light-transmitting regions and the plurality of light-blocking regions differ among different wavelength bands W1, W2, . . . , and Wn.

Thus, the spatially modulating coding element CS includes a plurality of light-transmitting regions (regions A) and a plurality of light-blocking regions (regions A) in the spatial direction in the spatial distribution of the optical transmittance. In addition, the spatial distribution of the plurality of light-transmitting regions and the plurality of light-blocking regions differ among different wavelength bands W1, W2, . . . , and Wn.

Figure 16C:
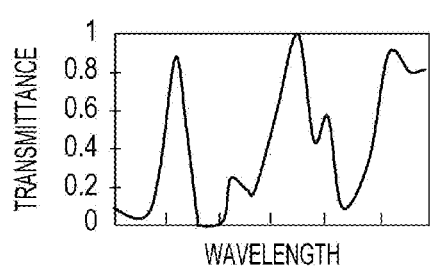
FIG. 16C illustrates an example of the spectral transmittance of in a region A1 of the spatially modulating coding element CS of the imaging apparatus D4 illustrated in FIG. 12.
Figure 16D:
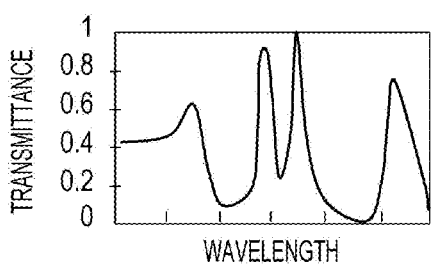
FIG. 16D illustrates an example of the spectral transmittance of in a region A2 of the spatially modulating coding element CS of the imaging apparatus D4 illustrated in FIG. 12.

FIGS. 16C and 16D illustrate the spectral transmittances of, respectively, a region A1 and a region A2, which are two representative regions A among the plurality of regions A included in the spatially modulating coding element CS according to the present embodiment.

The spectral transmittance in each of the regions A of the spatially modulating coding element CS has a lower resolving power in the wavelength direction than does the spectral transmittance of the narrow-band coding element illustrated in FIGS. 13A and 13B. Hereinafter, the resolving power of the spectral transmittance in the regions A will be described in more concrete terms with the region A1 serving as an example.

Figure 17:
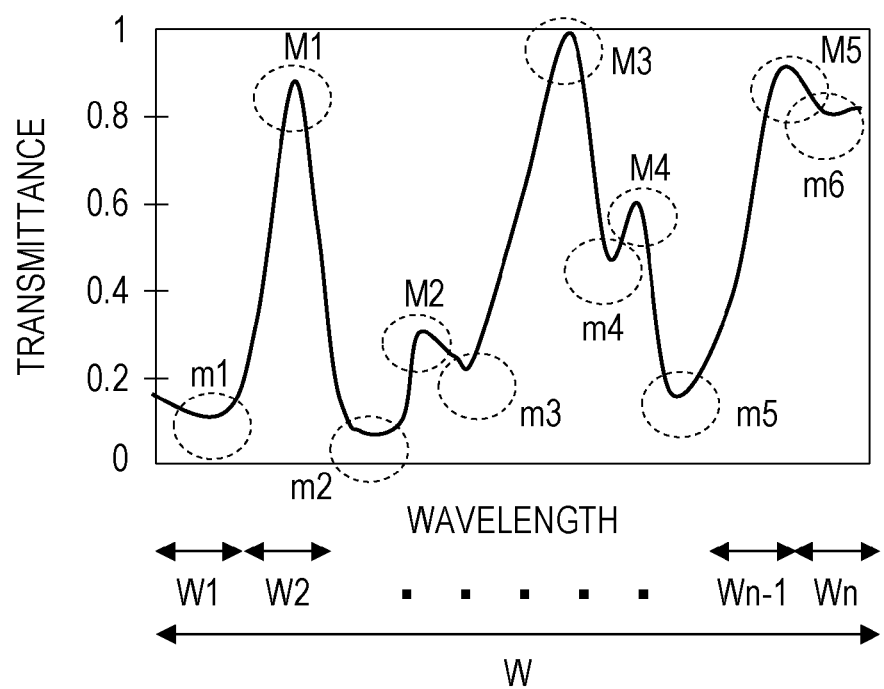
FIG. 17 is an illustration for describing the wavelength resolving power of the spectral transmittance in a given region of the spatially modulating coding element CS.

FIG. 17 illustrates the spectral transmittance in the region A1 of the spatially modulating coding element CS. The spectral transmittance illustrated in FIG. 17 is normalized such that the optical transmittance within the target wavelength band W has a maximum value of 1 and a minimum value of 0. The spectral transmittance illustrated in FIG. 17 has local maxima M1, M2, M3, M4, and M5 and local minima m1, m2, m3, m4, m5, and m6. As can be seen from FIG. 17, the local maxima M1, M3, M4, and M5 are no less than 0.5. For example, the local maximum M1 is adjacent to the local minimum m1 and the local minimum m2. At a wavelength $\lambda 1$, the transmittance takes a mean value of the local minimum m1 and the local maximum M1. In addition, at a wavelength $\lambda 2$, the transmittance takes a mean value of the local minimum m2 and the local maximum M1. In this case, a wavelength band width corresponding to the wavelength $\lambda 2$-the wavelength $\lambda 1$ corresponds to the resolving power in the wavelength direction. In the spatially modulating coding element CS, at least part of the wavelength band width corresponding to the resolving power is greater than the width of the wavelength bands W1, W2, . . . , and Wn. Meanwhile, as described above, the narrow-band coding element includes the transmission wavelength range T having a width equivalent to the width of the wavelength bands W1, W2, . . . , and Wn. The transmission wavelength range T corresponds to the resolving power of the narrow-band coding element. Therefore, it can be said that the spectral transmittance in the region A1 of the spatially modulating coding element CS illustrated in FIG. 17 has a lower resolving power in the wavelength direction than does the spectral transmittance of the narrow-band coding element.

Subsequently, an example of a condition that the spectral transmittance in each region A is to satisfy will be described. Here, the example is described using the characteristics of the spectral transmittance in which the spectral transmittance of the narrow-band coding element described above and the spectral transmittance of the region A of the spatially modulating coding element are superimposed on each other (hereinafter, may simply be referred to as the superimposed spectral transmittance).

Figure 18A:
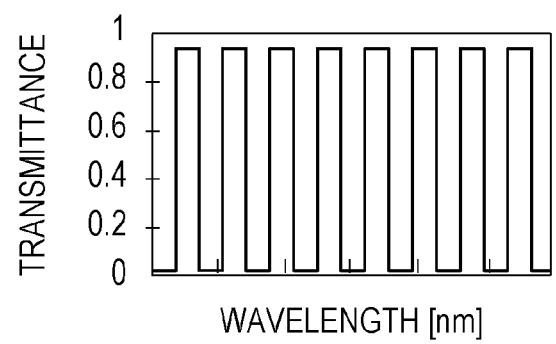
FIG. 18A illustrates an example of the wavelength and the intensity of light obtained when the light has passed through a narrow-band coding element C1.
Figure 18B:
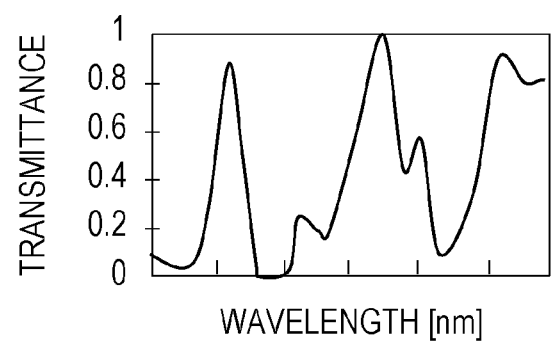
FIG. 18B illustrates an example of the wavelength and the intensity of light obtained when the light has passed through the spatially modulating coding element CS.
Figure 18C:
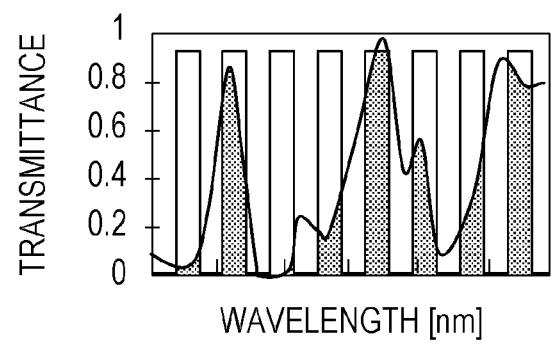
FIG. 18C illustrates an example of the wavelength and the intensity of light obtained when the light has passed through both the narrow-band coding element C1 and the spatially modulating coding element CS.

FIG. 18A illustrates the spectral transmittance of the narrow-band coding element, and FIG. 18B illustrates the spectral transmittance in a given region A1 of the spatially modulating coding element CS. In addition, FIG. 18C illustrates a graph in which the spectral transmittances illustrated in FIGS. 18A and 18B are superimposed on each other, and portions in which the light-transmitting regions overlap are indicated by hatching. This hatched portions indicate the wavelength and the intensity of light that has a uniform intensity distribution in the target wavelength band W and is transmitted upon being incident on the narrow-band coding element and the region A1 of the spatially modulating coding element CS. Here, the mean value of the transmittances in the respective wavelength bands W1, W2, . . . , and Wn is obtained by integrating the transmittances within the range of each of the wavelength bands and by dividing the result by the width of the wavelength band. In the present disclosure, the mean value of the transmittances in each wavelength band obtained through this method is referred to as a mean transmittance of that wavelength band.

FIG. 19 illustrates only the portions indicated by hatching in the spectral transmittance illustrated in FIG. 18C. In the present embodiment, in the spectral transmittance illustrated in FIG. 19, the mean transmittance is no less than 0.5 in at least two or more wavelength bands among the wavelength bands W1, W2, . . . , and Wn. For example, in FIG. 19, the mean transmittance is no less than 0.5 in the wavelength band W4, the wavelength band Wn-1, and so on.

When the spectral transmittance of another region A different from the region A1 and the spectral transmittance of the narrow-band coding element are superimposed on each other, a spectral transmittance different from the one illustrated in FIG. 19 is obtained. Specifically, the combination or the number of wavelength bands in which the mean transmittance is no less than 0.5 differs.

Thus, with regard to the spectral transmittance in each region A, it is sufficient that the superimposed spectral transmittance has a mean transmittance of no less than 0.5 in two or more wavelength bands and the spectral transmittances in the regions A have mutually different spectral transmittances.

In addition, the spectral transmittance in each region A may satisfy a condition 1 or a condition 2 described hereinafter.

In the ith row of the spatially modulating coding element CS ($1 \leq i \leq 6$), a set X of the regions A arrayed in one line in the row direction will be considered. In each region A in the set X, a vector Ai(j) of one row by eight columns having, as its elements, the values of the superimposed mean transmittances in a wavelength band Wj ($1 \leq j \leq n$) in the regions A of the set X will be considered. The superimposed mean transmittance corresponds to a mean transmittance in the spectral transmittance in which the spectral transmittance in each region A and the spectral transmittance of the narrow-band coding element are superimposed on each other. In the present embodiment, this vector Ai(j) is independent for any given j, or in other words, among any given wavelength bands (condition 1). For example, in a set X1 of the regions A in the first row, a vector having, as its elements, the values of the superimposed mean transmittances in the wavelength band W1 is expressed as A1(1). In a similar manner, in the set X1 of the regions A in the first row, a vector having, as its elements, the values of the superimposed mean transmittances in the wavelength band W2 is expressed as A1(2).

The vector A1(1) and the vector A1(2) are independent from each other. Vectors may be independent from each other in all the combinations of the wavelength bands W1, W2, . . . , and Wn. Alternatively, vectors may be independent from each other among some of the wavelength bands W1, W2, . . . , and Wn.

In addition, in the present embodiment, the vector Ai(j) is independent for any given i, or in other words, independent from any given row (condition 2). For example, in the wavelength band W1, a vector having, as its elements, the values of the superimposed mean transmittances in a set X1 of the regions A in the first row is expressed as A1(1). In a similar manner, in the wavelength band W1, a vector having, as its elements, the values of the superimposed mean transmittance in a set X2 of the regions A in the second row is expressed as A2(1) The vector A1(1) and the vector A2(1) are independent from each other. Vectors may be independent from each other in all the combinations of the rows. Vectors may be independent from each other in some combinations of the rows.

A binary-scale spectral transmittance may be employed. The binary-scale spectral transmittance is defined such that the mean transmittance takes a value of either substantially 1 or substantially 0.

Figure 20A:
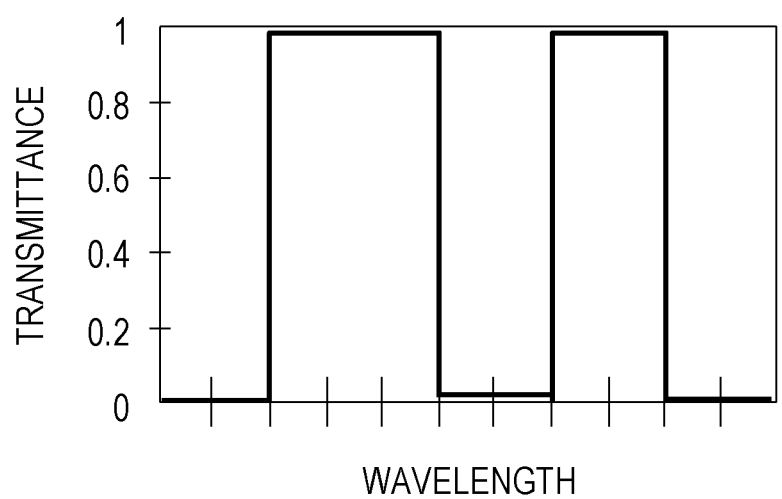
FIG. 20A illustrates an example of a binary-scale spectral transmittance.
Figure 20B:
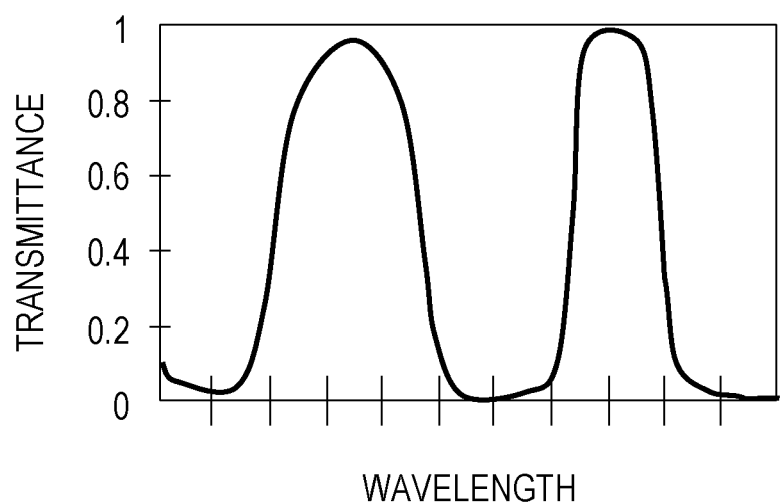
FIG. 20B illustrates another example of a binary-scale spectral transmittance.

An example of the binary-scale spectral transmittance is illustrated in FIG. 20A. The spectral transmittance illustrated in FIG. 20A takes a value of either 0 or 1 in the entire wavelength bands. Meanwhile, the spectral transmittance as illustrated in FIG. 20B is also a binary-scale spectral transmittance.

FIGS. 21A and 21B illustrate another configuration example of the spatially modulating coding element CS according to the present embodiment. FIGS. 21A and 21B illustrate a configuration having a greater number of regions A than does the configuration of the example illustrated in FIG. 16A. FIG. 21A illustrates an example of the transmittance distribution of the spatially modulating coding element CS in which each region A has a binary-scale spectral transmittance. In FIG. 21A, a portion of the spatially modulating coding element CS is enclosed by a rectangular and enlarged, and the transmittance distribution in the enclosed portion is illustrated for each wavelength band. In FIG. 21A, a black portion indicates a light-blocking region in which the optical transmittance is substantially 0. Meanwhile, a white portion indicates a light-transmitting region in which the optical transmittance is substantially 1. In the example illustrated in FIG. 21A, the ratio of the number of the light-blocking regions to the number of the light-transmitting regions is 1 to 1, but an embodiment is not limited to this ratio. For example, the distribution may be skewed such that the ratio of the number of the light-transmitting regions to the number of the light-blocking regions is 1 to 9.

FIG. 21B illustrates an example of the spatially modulating coding element CS in which each region A has a continuous spectral transmittance.

As illustrated in FIGS. 21A and 21B, the spatially modulating coding element CS has different transmittance spatial distributions in the different wavelength bands W1, W2, . . . , and Wn. However, the spatial distribution of the transmittance in a predetermined wavelength band in a portion including a plurality of regions may match the spatial distribution of the transmittance in the stated wavelength band in another portion.

Some of the entire regions A of the spatially modulating coding element CS may be transparent regions. A transparent region in the present specification corresponds to a region that transmits light in the entire wavelength bands W1 to Wn included in the target wavelength band W at a substantially equal high transmittance (e.g., 0.8 or more). For example, half of the entire regions A may be transparent regions and the transparent regions may be disposed in a checkered pattern. In other words, in the two array directions (the lateral direction and the longitudinal direction in FIG. 16A) of the plurality of regions A in the spatially modulating coding element CS, regions A whose spectral transmittance differs depending on the wavelength band and the transparent regions can be arrayed in an alternating manner.

The spatially modulating coding element CS can be constituted by at least one of a multilayer film, an organic material, a diffraction grating structure, and a microstructure containing metal. In a case in which a multilayer film is used, for example, a dielectric multilayer film or a multilayer film that includes a metal layer can be used. In this case, the cells are formed such that at least one of the thickness of the multilayer film, the materials, and the order in which the layers are stacked differs among the different cells. Thus, different spectral characteristics can be achieved in different regions A. In a case in which each region A has a binary-scale spectral transmittance, by using the multilayer film, sharp rise and fall of the spectral transmittance can be achieved. The configuration in which an organic material is used can be implemented by using different pigment or dyestuffs to be contained in different regions A or by stacking layers of different kinds of materials. The configuration in which the diffraction grating structure is used can be implemented by providing a diffraction structure in which the diffraction pitch or depth differs in different regions A. In a case in which a microstructure containing metal is used, the microstructure can be fabricated by utilizing dispersion caused by the plasmon effect.

Image Sensor S

The image sensor S is a monochrome image sensor having a plurality of light-sensor cells (also referred to as pixels in the present specification) that are arrayed two-dimensionally. The image sensor S can, for example, be a charge-coupled device (CCD) sensor, a complementary metal-oxide semiconductor (CMOS) sensor, an infrared array sensor, a terahertz array sensor, or a millimeter-wave array sensor. A light-sensor cell can, for example, be constituted by a photodiode. As the image sensor S, for example, a color image sensor having a filter of R/G/B, R/G/B/IR, or R/G/B/W may also be used. With the use of a color image sensor, the amount of information pertaining to the wavelengths can be increased, and the accuracy of reconstructing the spectrally separated images F can be increased.

Signal Processing Circuit Pr

The signal processing circuit Pr estimates the spectrally separated images F on the basis of the captured image G acquired by the image sensor S.

The signal processing circuit Pr processes an image signal output from the image sensor S. The signal processing circuit Pr can, for example, be implemented by a combination of a computer program with a digital signal processor (DSP), a programmable logic device (PLO) such as a field programmable gate array (FPGA), or a central processing unit (CPU) or a graphics processing unit (CPU). Such a computer program is stored in a recording medium such as a memory, and as the CPU executes the program, the operation process described later can be executed. The signal processing circuit Pr may be a constituent element of a signal processing device that is electrically connected to the imaging apparatus D4 with a cable or wirelessly. In such a configuration, a personal computer (PC) electrically connected to the imaging apparatus D4 or a signal processing device, such as a cloud server on the Internet, includes the signal processing circuit Pr. In the present specification, a system that includes such a signal processing device and the imaging apparatus is referred to as a spectroscopic system. The signal processing circuit Pr acquires such information pertaining to the transmittance distributions of the narrow-band coding element and the spatially modulating coding element CS in advance as design data or through measured calibration and uses the information in operations and processing, which will be described later.

Measured calibration will be described. For example, in a case in which the target wavelength band is the entire visible light range, a white board serving as an object is disposed at the position of the object O, and white light from the object O is made to pass through the narrow-band coding element or the spatially modulating coding element CS. Thus, an image of the narrow-band coding element or the spatially modulating coding element CS can be formed on the image sensor S. It is possible to calculate how each region A modulates white light that equally contains wavelength components of the entire visible light from the image of the narrow-band coding element or the spatially modulating coding element CS, or in other words, it is possible to calculate the spectral transmittance of each region A. In addition, light whose wavelength band has been limited by a bandpass filter may be used. Through multiple instances of imaging with the plurality of bandpass filters being replaced, transmittance data in the entire desired wavelength bands may be acquired. Some of the wavelength bands may be selected and measured, and the transmittance data in the other wavelength bands may be calculated through interpolation of the measured data.

Other Configuration

The imaging apparatus D4 may further include a bandpass filter. The bandpass filter transmits only the target wavelength band W of the reflected light from the object O. Thus, components of wavelength bands other than the target wavelength band W that are not removed by the narrow-band coding element or the spatially modulating coding element can be removed. Thus, the spectrally separated images F with high separation precision only in a desired target wavelength band W can be obtained.

Operation

Figure 22:
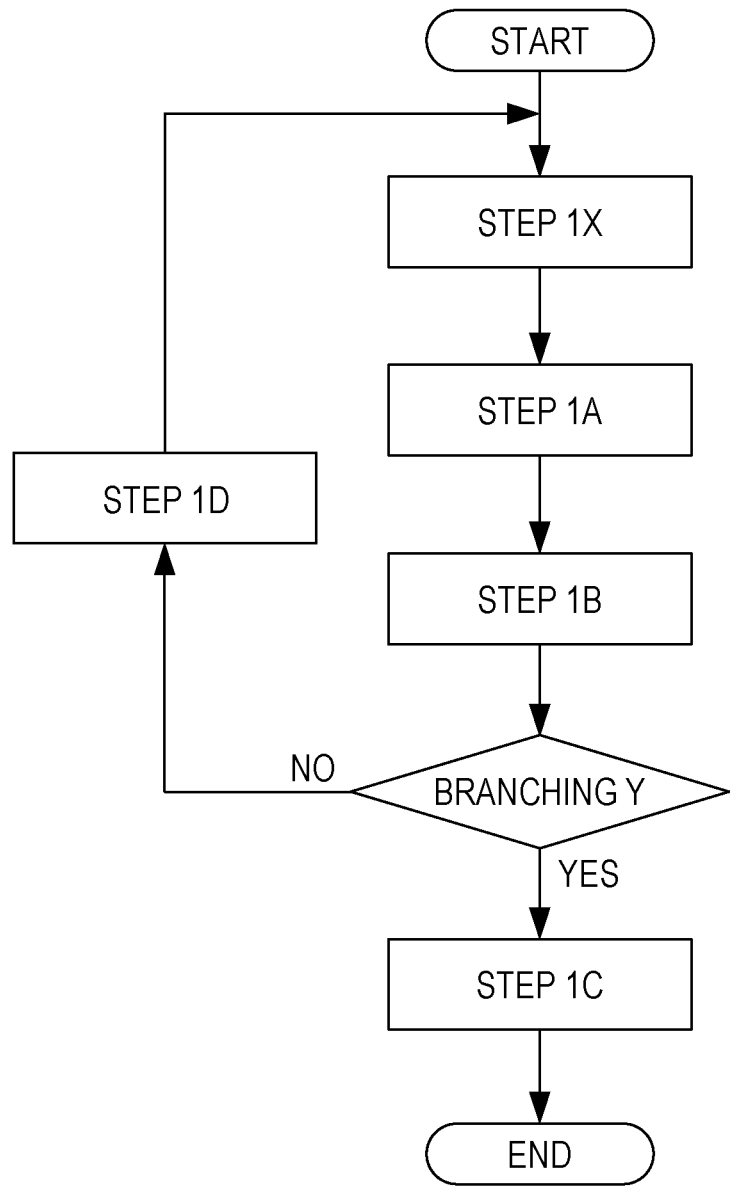
FIG. 22 is a flowchart illustrating an overview of a spectroscopic method according to the fourth embodiment.

Hereinafter, the operation of the imaging apparatus D4 according to the present embodiment will be described with reference to FIG. 22. FIG. 22 is a flowchart illustrating an overview of the spectroscopic method with the use of the spectroscopic system S1 according to the present embodiment.

In step 1X, the narrow-band coding element C1 is disposed in an optical path of the object O.

In step 1A, the intensity of incident light is spatially modulated in each wavelength band by using both the narrow-band coding element C1 and the spatially modulating coding element CS. This process is referred to as coding in the present specification. Specifically, light rays R from the object O are incident on the narrow-band coding element C1. Of the light incident on the narrow-band coding element C1, only light having a wavelength within the transmission wavelength range T passes through the narrow-band coding element C1, and light having a wavelength within the light-blocking wavelength range Q is blocked. Thus, the light rays R are modulated to light having a plurality of intensity peaks that are discrete relative to the wavelengths and is converged by the imaging lens 102. The light that has been converged by the imaging lens 102 is incident on the spatially modulating coding element CS. The light that has been modulated by the narrow-band coding element C1 is incident on each of the plurality of regions A of the spatially modulating coding element CS. Each region A modulates the light having a plurality of intensity peaks included in the incident light in accordance with the spectral transmittance of each region A and outputs the result. As described above, the narrow-band coding element C1 and the spatially modulating coding element CS have the spectral transmittance characteristics illustrated in FIG. 20A or 20B relative to the target wavelength band W. Therefore, the narrow-band coding element C1 and the spatially modulating coding element CS superimpose light in at least two of the wavelength bands W1, W2, ..., and Wn to be separated and outputs the result to the image sensor S. This means that data compressed in the wavelength direction is acquired.

Subsequently, in step 1B, the captured image G is generated from the light that has passed through the narrow-band coding element C1 and the spatially modulating coding element CS and is incident on the image sensor S. Specifically, the light that is incident on the plurality of pixels of the image sensor S is converted to a plurality of electric signals (pixel signals). A set of the plurality of converted pixel signals is the captured image G. An example of the captured image G is illustrated in FIG. 12. A plurality of black dots included in the captured image G illustrated in FIG. 12 schematically represent low-luminance portions generated through coding. The number and the disposition of the black dots illustrated in FIG. 12 do not reflect the actual number and disposition. In reality, the low-luminance portions can be generated in a greater number than those illustrated in FIG. 12.

Thereafter, at the branching Y, it is determined whether imaging has been carried out by using all of the narrow-band coding elements. If imaging has not been carried out by using all of the narrow-band coding elements, the process proceeds to step 1D.

In step 1D, the narrow-band coding element C1 is replaced with the narrow-band coding element C2. Thereafter, step 1X, step 1A, and step 1B are carried out again using the replaced narrow-band coding element C2.

In a case in which the narrow-band coding device includes three or more narrow-band coding elements, the cycle of step 1D, step 1X, step 1A, and step 1B is repeated until imaging with all of the narrow-band coding elements is finished. In a case in which the narrow-band coding device includes only one narrow-band coding element, step 1X, step 1A, and step 1B are each carried out once.

When imaging with all of the narrow-band coding elements is completed, the process proceeds to step 1C.

In step 1O, the signal processing circuit Pr generates the spectrally separated images F on the basis of the captured image G acquired by the image sensor S, the wavelength distribution information of the optical transmittance of the narrow-band coding element, and the spatial distribution information and the wavelength distribution information of the optical transmittance of the spatially modulating coding element CS.

The method for generating the spectrally separated images F in step 1C will be described in more concrete terms.

The data of the spectrally separated images F is indicated as a spectrally separated image f, and the data of the acquired captured image G is indicated as a captured image g. The captured image g can be expressed by the following expression (5) that includes the spectrally separated image f.

$$g = Hf \quad (5)$$

$$\begin{bmatrix} g_1 \\ g_2 \\ \vdots \\ g_m \end{bmatrix} = \begin{bmatrix} h_1(w_1) & h_1(w_2) & \ldots & h_1(w_n) \\ h_2(w_1) & h_2(w_2) & & h_2(w_n) \\ \vdots & & \ddots & \vdots \\ h_m(w_1) & h_m(w_2) & \ldots & h_m(w_n) \end{bmatrix} \begin{bmatrix} f_1(w_1) \\ f_2(w_2) \\ \vdots \\ f_n(w_n) \end{bmatrix}$$

In the expression (5), the spectrally separated image f is indicated as a vector having, as its elements, image data f1, f2, . . . , and fn of the respective wavelength bands W1, W2, . . . , and Wn. In addition, the captured image g is expressed as a vector having, as its elements, image data g1, g2, . . . , and gn acquired in the respective instances of imaging. In the following description, the terms the spectrally separated image vector f and the captured image vector g may be used in some cases.

When the number of pixels in the x-direction of the spectrally separated images F to be obtained is represented by px and the number of pixels in the y-direction is represented by py, each pieces of the image data f1, f2, . . . , and fn of the respective wavelength bands has two-dimensional data of px×py pixels. The spectrally separated image f has three-dimensional data with px×py×n elements.

Meanwhile, when the imaging is carried out m times with the m narrow-band coding elements being replaced one after another, the captured image g has three-dimensional data with px×py×m elements.

In the expression (4), the matrix H expresses a transformation in which the image data f1, f2, . . . , and fn of the respective wavelength bands, which are elements of the spectrally separated image vector f, are coded with coding information that differs in different wavelength bands and the obtained results are added. The matrix H is a matrix of px×py×m rows by px×py×n columns. Its matrix element hi(wj) (1≤i≤m, 1≤j≤n) is expressed by the product of the optical transmittance in a wavelength band wj of a narrow-band coding element Ci used for imaging in an imaging time Ti and the spatial distribution of the optical transmittance of the spatially modulating coding element CS. In the present embodiment, when the narrow-band coding device 200 includes two narrow-band coding elements as illustrated in FIGS. 13A and 13B, for example, the matrix element h1(wj) is 0 when j is odd, and the matrix element h2(wj) is 0 when j is even. In a similar manner, when the narrow-band coding device 200 includes three or more narrow-band coding elements, the matrix H regularly contains 0 components. When the matrix H contains a large number of 0 components, the number of unknowns to be considered in the operation process is reduced.

Here, the image data f1, f2, . . . , and fn in the respective wavelength bands W1, W2, . . . , and Wn are data each having px×py elements, and thus the spectrally separated image f expressed as a vector in the right-hand side corresponds to a one-dimensional vector of px×py×n rows by one column in a strict sense. In this case, the captured image g can be converted to and expressed as a one-dimensional vector of px×py×m rows by one column.

It seems that the spectrally separated image vector f can be calculated by solving an inverse problem of the expression (5) if the captured image vector g and the matrix H are given. However, m is less than n, and the number px×py×n of elements in the spectrally separated image vector f to be obtained is greater than the number px×py×m of elements in the acquired captured image vector g. Therefore, this problem is an ill-posed problem and cannot be solved as-is. Thus, the signal processing circuit Pr according to the present embodiment finds a solution through the compressed sensing technique by utilizing the redundancy of the image included in the spectrally separated image f. Specifically, the spectrally separated image vector f to be obtained is estimated by solving the following expression (6).

$$f' = \operatorname*{argmin}_{f}\{\|g - Hf\|_{l_2} + \tau \Phi(f)\} \quad (6)$$

Here, an estimated image vector f' represents the estimated spectrally separated image vector f. The signal processing circuit Pr converges the solution through a recursive iterative operation and can calculate the estimated image vector f' as the final solution.

The expression (6) means to obtain the estimated image vector f' that minimizes the sum of the first term and the second term inside the curly braces on the right-hand side. The first term inside the curly braces in the above expression represents the amount of deviation between the estimation result Hf and the captured image vector g, or in other words, is a residual term. In the present embodiment, the residual term is the sum of squares of the difference between the acquired captured image vector g and the matrix Hf obtained by subjecting the spectrally separated image vector f in the estimation process to the system transformation by the matrix H. Alternatively, the residual term may be an absolute value, a square root of sum of squares, or the like. The second term in the curly braces is a regularization term. The expression φ(f) in the second term is a constraint in the regularization of the spectrally separated image vector f and is a function that reflects sparse information of the estimated data. The expression acts to smooth or stabilize the estimated data. The regularization term can, for example, be represented by the discrete cosine transform (DCT) of the spectrally separated image vector f, the wavelet transform, the Fourier transform, the total variation (TV), or the like. For example, if the total variation is used, stable estimated data in which an influence of noise of the captured image vector g is suppressed can be acquired. The sparseness of the object O in the space of each regularization term differs depending on the texture of the object O. A regularization term in which the texture of the object O becomes sparser in the space of the regularization term may be selected. Alternatively, a plurality of regularization terms may be included in an operation. The expression τ in the second term is a weighting factor, and as the value of τ is greater, the amount of the redundant data to be reduced increases, or in other words, the compression rate increases. As the value of τ is smaller, the convergence to the solution is reduced. The weighting factor τ is set to an appropriate value such that the spectrally separated image vector f converges to a certain degree and is not overcompressed.

Here, although an operation example in which the compressed sensing indicated in the expression (6) is illustrated, another technique may be employed to find a solution. For example, another statistical method, such as a maximum likelihood estimation method and a Bayes estimation method, can also be used.

Effects of Fourth Embodiment

The narrow-band coding element includes a plurality of light-transmitting regions (transmission wavelength ranges T) and a plurality of light-blocking regions (light-blocking wavelength ranges Q) in the wavelength direction. Thus, light that has been coded by the narrow-band coding element and the spatially modulating coding element CS and is incident on the image sensor has discrete intensity peaks in the plurality of wavelength bands corresponding to the transmission wavelength ranges T. Therefore, in the operation for reconstructing the spectrally separated images F from the light incident on the image sensor, the number of unknowns to be considered can advantageously be reduced. This is equivalent to that the wavelength resolving power can be increased. Accordingly, the accuracy of the operation increases, and thus multi-wavelength high-resolution spectrally separated images F can be obtained.

In addition, light that has passed through a given region A of the spatially modulating coding element is made to be incident only on one corresponding pixel of the image sensor, and thus light from two or more regions A is not incident on a single pixel of the image sensor. Accordingly, the operation by the signal processing circuit Pr is simplified.

In addition, when the narrow-band coding element includes the transmission wavelength ranges T and the light-blocking wavelength ranges Q arrayed periodically in the wavelength direction, the transmission wavelength ranges T are constantly present at regular intervals. In other words, the transmission wavelength ranges T are present in a broader range in the target wavelength band W. Accordingly, spectrally separated images in a greater number of wavelength bands can be obtained by using a single narrow-band coding element.

In addition, when a plurality of narrow-band coding elements are used, as compared to a case in which a single narrow-band coding element is used, the number of instances of imaging increases, but the number of the wavelength bands included in the entire captured image increases. Accordingly, the multi-wavelength spectrally separated images F can be obtained.

When the number of the narrow-band coding elements to be used is increased, in a case in which, for example, the target wavelength band W and the number of the wavelength bands stay the same, the number of the transmission wavelength ranges T in a single narrow-band coding element can be reduced. In other words, the range of the light-blocking wavelength ranges Q in a single narrow-band coding element can be broadened. Accordingly, the number of unknowns in the matrix H is reduced in the operation process for obtaining the spectrally separated images by the signal processing circuit Pr, and the calculation is simplified. Thus, the accuracy in reconstructing the spectrally separated images can be increased.

In addition, there may be a case in which the number of the transmission wavelength ranges T in a single narrow-band coding element is limited. In that case, if the target wavelength band is equal, by increasing the number of the narrow-band coding elements to be used, the number of the transmission wavelength ranges T can be increased as a whole. In other words, the target wavelength band W can be divided into a larger number of transmission wavelength ranges T, and thus the wavelength bands can be narrowed. Thus, an observation in narrower bands becomes possible.

In addition, in the present embodiment, the spatial distribution of the optical transmittance (spatial distribution of the plurality of light-transmitting regions and the plurality of light-blocking regions) has wavelength dependence in the spatially modulating coding element. Therefore, light can be coded at the respective wavelengths by the spatially modulating coding element. Therefore, a separate dispersive element, such as a prism, does not need to be used, and a typical imaging lens may be used. Thus, the size of the imaging apparatus can be reduced. In addition, an occurrence of coma aberration arising when a dispersive element is used can be suppressed as well, and thus a decrease in the resolution can be suppressed. In addition, in the present disclosure in which an image shift for each wavelength by a dispersive element is not carried out, the range of saturation of an image arising when intense light is incident on the image sensor is limited, which is advantageous.

What is claimed is:

1. An imaging apparatus, comprising:
    a first coding element that includes regions arrayed two-dimensionally in an optical path of light incident from an object; and
    an image sensor disposed in an optical path of light that has passed through the first coding element,
    wherein the regions include a first region and a second region,
    wherein a wavelength distribution of an optical transmittance of the first region has a local maximum in each of a first wavelength band and a second wavelength band that differ from each other,
    wherein a wavelength distribution of an optical transmittance of the second region has a local maximum in each of a third wavelength band and a fourth wavelength band that differ from each other,
    wherein, when the wavelength distribution of the optical transmittance of the first region is normalized such that the optical transmittance of the first region has a maximum value of 1 and a minimum value of 0, the local maxima in the first wavelength band and the second wavelength band are both no less than 0.5,
    wherein, when the wavelength distribution of the optical transmittance of the second region is normalized such that the optical transmittance of the second region has a maximum value of 1 and a minimum value of 0, the local maxima in the third wavelength band and the fourth wavelength band are both no less than 0.5,
    wherein at least one selected from the group of the first wavelength band and the second wavelength band differs from the third wavelength band and the fourth wavelength band, and
    wherein, in operation, the image sensor acquires an image in which components of the first wavelength band, the second wavelength band, the third wavelength band, and the fourth wavelength band of the light that has passed through the first coding element are superimposed on one another.

2. The imaging apparatus according to claim 1, wherein the regions include at least one transparent region.

3. The imaging apparatus according to claim 2, wherein the at least one transparent region comprises a plurality of transparent regions,
    wherein the regions include regions whose optical transmittance differs in different wavelengths and the plurality of transparent regions, the two regions are arrayed in an alternating manner in one array direction of the regions and another array direction that is perpendicular to the one array direction.

4. The imaging apparatus according to claim 1, wherein the regions are arrayed two-dimensionally in a matrix,
    wherein a vector having, as its elements, values of transmittance of light in a fifth wavelength band in respective regions belonging to a set of regions arrayed in a single row or column included in the regions and a vector having, as its elements, values of transmittance of light in the fifth wavelength band in respective regions belonging to a set of regions arrayed in another row or column included in the regions are independent from each other, and wherein a vector having, as its elements, values of transmittance of light in a sixth wavelength band in respective regions belonging to a set of regions arrayed in a single row or column included in the regions and a vector having, as its elements, values of transmittance of light in the sixth wavelength band in respective regions belonging to a set of regions arrayed in another row or column included in the regions are independent from each other.

5. The imaging apparatus according to claim 1, further comprising:
an optical system that is disposed between the object and the first coding element and that converges the light from the object on a surface of the first coding element,
wherein the first coding element is disposed on the image sensor.

6. The imaging apparatus according to claim 5, wherein the image sensor includes pixels, and
wherein the regions correspond to the respective pixels.

7. The imaging apparatus according to claim 1, further comprising:
an optical system that is disposed between the object and the first coding element and that converges the light from the object on a surface of the image sensor,
wherein the first coding element and the ge sensor are spaced apart from each other.

8. The imaging apparatus according to claim 1, further comprising:
an optical system that is disposed between the first coding element and the image sensor and that converges the light from the object that has passed through the first coding element on a surface of the image sensor.

9. The imaging apparatus according to claim 1, further comprising:
a signal processing circuit that, in operation, generates images in respective wavelength bands of the light that has passed through the first coding element on the basis of the image acquired by the image sensor and a spatial distribution and a wavelength distribution of an optical transmittance of the first coding element.

10. The imaging apparatus according to claim 9, wherein, in operation, the signal processing circuit generates the images in the respective wavelength bands through a statistical method.

11. The imaging apparatus according to claim 9, wherein the number of pieces of data in the images in the respective wavelength bands is greater than the number of pieces of data in the image acquired by the image sensor.

12. The imaging apparatus according to claim 9, wherein the image sensor includes pixels, and
wherein, in operation, the signal processing circuit generates, as the images in the respective wavelength bands, a vector f' estimated on the basis of the expression $$f' = \underset{f}{\operatorname{argmin}}\{\|g - Hf\|_{l_2} + \tau \Phi(f)\},$$

wherein $\phi(f)$ is a regularization term and $\tau$ is a weighting factor, by using a vector g having, as its elements, signal values of the pixels in the image acquired by the image sensor and a matrix H determined by the spatial distribution and the wavelength distribution of the optical transmittance of the first coding element.

13. The imaging apparatus according to claim 9, wherein, in operation, the signal processing circuit generates the images in the respective wavelength bands in the form of a moving image.

14. The imaging apparatus according to claim 1, further comprising:
at least one second coding element whose optical transmittance is uniform in a spatial direction and that includes light-transmitting regions and light-blocking regions in the wavelength direction,
wherein the image sensor is disposed in an optical path of light that has passed through the first coding element and the at least one second coding element.

15. The imaging apparatus according to claim 14, wherein, in the at least one second coding element, the light-transmitting regions have an equal wavelength band width and the light-blocking regions present between two closest light-transmitting regions in the light-transmitting regions have an equal wavelength band width.

16. The imaging apparatus according to claim 14, wherein the at least one second coding element comprises a plurality of second coding elements, and
wherein wavelength bands of the light-transmitting regions in one of the plurality of second coding elements are different from wavelength bands of the light-transmitting regions in another one of the plurality of second coding elements.

17. The imaging apparatus according to claim 14, further comprising:
a signal processing circuit that, in operation, generates images in respective wavelength bands of the light that has passed through the first coding element and the at least one second coding element on the basis of the image output by the image sensor, a spatial distribution and a wavelength distribution of an optical transmittance of the first coding element, and a wavelength distribution of an optical transmittance of the at least one second coding element.

18. The imaging apparatus according to claim 1, wherein the wavelength distribution of the optical transmittance in each of the regions is a random distribution.

19. The imaging apparatus according to claim 1, wherein a spatial distribution of the optical transmittance of the first coding element in each of the first wavelength band, the second wavelength band, the third wavelength band, and the fourth wavelength band is a random distribution.

20. A spectroscopic system, comprising:
an imaging apparatus that includes
a first coding element that includes regions arrayed two-dimensionally in an optical path of light incident from an object, and
an image sensor disposed in an optical path of light that has passed through the first coding element,
wherein the regions include a first region and a second region,
wherein a wavelength distribution of an optical transmittance of the first region has a local maximum in each of a first wavelength band and a second wavelength band that differ from each other,
wherein a wavelength distribution of an optical transmittance of the second region has a local maximum in each of a third wavelength band and a fourth wavelength band that differ from each other, wherein, when the wavelength distribution of the optical transmittance of the first region is normalized such that the optical transmittance of the first region has a maximum value of 1 and a minimum value of 0, the local maxima in the first wavelength band and the second wavelength band are both no less than 0.5, wherein, when the wavelength distribution of the optical transmittance of the second region is normalized such that the optical transmittance of the second region has a maximum value of 1 and a minimum value of 0, the local maxima in the third wavelength band and the fourth wavelength band are both no less than 0.5, wherein at least one selected from the group of the first wavelength band and the second wavelength band differs from the third wavelength band and the fourth wavelength band, and wherein, in operation, the image sensor acquires an image in which components of the first wavelength band, the second wavelength band, the third wavelength band, and the fourth wavelength band of the light that has passed through the first coding element are superimposed on one another; and a signal processing device that, in operation, generates images in respective wavelength bands of the light that has passed through the first coding element on the basis of the image acquired by the image sensor and a spatial distribution and a wavelength distribution of an optical transmittance of the first coding element.

* * * * *